US011922342B2

(12) United States Patent
Handler et al.

(10) Patent No.: US 11,922,342 B2
(45) Date of Patent: Mar. 5, 2024

(54) SEARCHING TRIPS BASED ON ACCUMULATED SUBSCRIPTION DAYS

(71) Applicant: Inspirato LLC, Denver, CO (US)

(72) Inventors: Brent Handler, Englewood, CO (US); Brad Handler, Denver, CO (US); Ashley Roybal, Denver, CO (US); Rodolfo Rodriguez, Denver, CO (US); Cody Holloway, Denver, CO (US); Mark Wilson, Denver, CO (US); Michael Webster, Evergreen, CO (US); Kevin Baird, Denver, CO (US); Sam Schulte, Centennial, CO (US); Jesus Gandarilla, Westminster, CO (US); Sienna Stonesmith, Denver, CO (US)

(73) Assignee: INSPIRATO, LLC, Denver, CO (US)

( * ) Notice: Subject to any disclaimer, the term of this patent is extended or adjusted under 35 U.S.C. 154(b) by 199 days.

(21) Appl. No.: 17/505,947

(22) Filed: Oct. 20, 2021

(65) Prior Publication Data

US 2023/0121288 A1     Apr. 20, 2023

(51) Int. Cl.
    *G06Q 10/02*     (2012.01)

(52) U.S. Cl.
    CPC .................. *G06Q 10/025* (2013.01)

(58) Field of Classification Search
    CPC ....................................................... G06Q 50/14
    See application file for complete search history.

(56) References Cited

U.S. PATENT DOCUMENTS

| 8,407,099 B1* | 3/2013 | Frank ................... G06Q 10/025 705/26.1 |
| 2002/0138312 A1* | 9/2002 | Blau ..................... G06Q 30/02 705/14.69 |

(Continued)

FOREIGN PATENT DOCUMENTS

| WO | 2020041145 | 2/2020 |

OTHER PUBLICATIONS

"How to Request Multiple Uber Vehicles"; accessed as of Mar. 16, 2016; WikiHow; pp. 1-2; http://www.wikihow.com/Request-Multiple-Uber-Vehicles (Year: 2016).*

(Continued)

*Primary Examiner* — Emmett K. Walsh
*Assistant Examiner* — Michael C Moroney
(74) *Attorney, Agent, or Firm* — BRYAN CAVE LEIGHTON PAISNER LLP

(57) ABSTRACT

Systems and methods are disclosed for providing a subscription service. The systems and methods include operations for setting, by an experience-based subscription service, a number of subscription value days; determining an amortized subscription parameter for a subscriber of the experience-based subscription service, the amortized subscription parameter representing a subscription cost accumulated over the number of subscription value days; identifying a plurality of experience-related resources available for access on future experience dates, each of the plurality of experience-related resources having a cost that satisfies the amortized subscription parameter; receiving, on a booking date, a (Continued)

request from the subscriber to reserve a given experience-related resource; and in response to receiving the request, preventing the subscriber from reserving a second experience-related resource during an in-use period that begins on the booking date and terminates after a period of time corresponding to the number of subscription value days.

20 Claims, 9 Drawing Sheets

(56) References Cited

U.S. PATENT DOCUMENTS

| | | | | |
|---|---|---|---|---|
| 2003/0040946 | A1* | 2/2003 | Sprenger | G06Q 30/06 705/6 |
| 2006/0190325 | A1* | 8/2006 | Tarsh | G06Q 30/02 705/14.16 |
| 2008/0183511 | A1* | 7/2008 | Handler | G06Q 30/02 705/5 |
| 2013/0041696 | A1* | 2/2013 | Richard | G06Q 50/14 705/5 |
| 2014/0089019 | A1* | 3/2014 | Petrowich | G06Q 30/0226 705/5 |
| 2015/0371155 | A1 | 12/2015 | Saint-Just et al. | |
| 2016/0260077 | A1* | 9/2016 | Hwang | G06Q 20/3563 |
| 2019/0065564 | A1* | 2/2019 | Twig | G06F 16/248 |
| 2019/0138950 | A1 | 5/2019 | Bayer et al. | |
| 2019/0325507 | A1* | 10/2019 | Rowley | G06Q 30/0641 |
| 2020/0027036 | A1* | 1/2020 | Unnerstall | G06Q 20/40 |
| 2020/0167699 | A1 | 5/2020 | Cohen | |
| 2021/0125109 | A1 | 4/2021 | Handler et al. | |
| 2021/0125113 | A1 | 4/2021 | Handler et al. | |
| 2021/0302606 | A1* | 9/2021 | Al-Saleh | G01V 1/34 |
| 2023/0019669 | A1* | 1/2023 | Alabbasi | G06N 3/04 |

OTHER PUBLICATIONS

Rand, Katherine; "How to Combine 3 Years of Disney Vacation Club Points for 1 Stay"; accessed as of Sep. 30, 2020; DVC Shop; pp. 1-8; https://dvcshop.com/how-to-combine-3-years-of-disney-vacation-club-points-for-1-stay (Year: 2020).*

"International Application Serial No. PCT US2022 033827, International Search Report dated Oct. 10, 2022", 5 pgs.

"International Application Serial No. PCT US2022 033827, Written Opinion dated Oct. 10, 2022", 8 pgs.

* cited by examiner

Dates

Check-in
Select available Check-in dates only.

October 2021 ▼

| Su | Mo | Tu | We | Th | Fr | Sa |
|---|---|---|---|---|---|---|
|  |  |  |  |  | 1 | 2 |
| 3 | 4 | 5 | 6 | 7 | 8 | 9 |
| 10 | 11 | 12 | 13 | 14 | 15 | 16 |
| 17 | 18 | 19 | 20 | 21 | 22 | 23 |
| 24 | 25 | 26 | 27 | 28 | 29 | 32 |
| 31 |  |  |  |  |  |  |

☐ Select Entire Month — 524

520 — >
522

How many Pass Days would you like to use? (0-35)
Select the number of days you're willing to wait until you can book your next trip.

0 days — 35 days
510

CLEAR

APPLY — 530

SEARCHING TRIPS BASED ON ACCUMULATED SUBSCRIPTION DAYS

BACKGROUND

Web-based travel services systems allow users to search through various travel services available by multiple providers. A user can specify a destination and travel time frame to find matching hotels, rental cars, and airfares along with their corresponding costs. The user can sort the results by price, type, and availability of the travel service. After the user finds a suitable hotel, rental car, or airfare, the user can utilize the web-based travel services to reserve the hotel, rental car, or airfare.

BRIEF DESCRIPTION OF THE DRAWINGS

Various ones of the appended drawings merely illustrate examples of the present disclosure and should not be considered as limiting its scope.

FIGS. 5A-C are illustrative graphical user interfaces of the experience services system, according to some examples.

DETAILED DESCRIPTION

Figure 1:
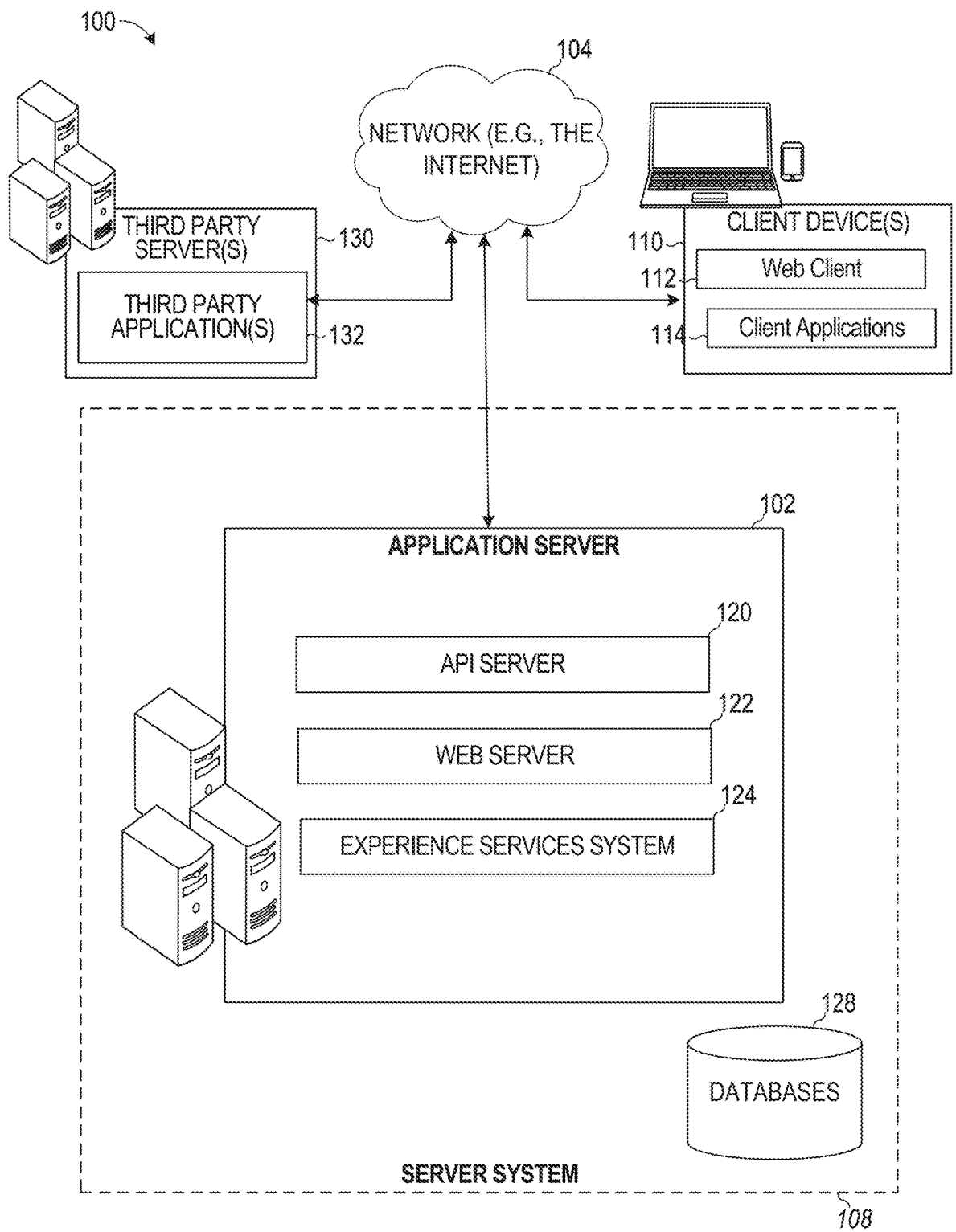
FIG. 1 is a block diagram illustrating a networked system for a subscription-based experience service, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Users typically spend a great deal of time and effort making arrangements for accessing or consuming experiences (e.g., travel or events) through experience-related resources, such as hotels, airfares, cruises, stays, and car rentals, that are within their budget. As an example, existing travel sites allow a user to input various travel criteria, such as travel dates and destinations, to search for all the available hotels, airfares, and car rentals that match the travel criteria. The existing travel sites also allow the user to sort and filter results based on a specified cost. While such existing travel sites generally work well for making travel arrangements, there is often a large disparity among cost and availability for the same or similar hotels, airfares, cruises, stays, and car rentals across different travel sites. This can be frustrating to users as the users are burdened with having to search through the available options across multiple travel sites to make sure they get the best price within their budget. Searching through multiple travel sites takes a great deal of time and effort and forces the users to navigate through multiple pages of information and manually compare results to make travel arrangements. Even still, the travel arrangements the users finally settle on may not provide the users with the best available options for the budget.

In addition, once a user finally finds a desired travel service, making reservations with the travel service requires the user to complete a checkout process by navigating through many checkout screens. For example, the user has to first select the desired travel service, then input various personal information on another screen, then navigate to a payment screen to provide payment information, and finally, the user can confirm reservation for the desired travel services in a confirmation screen. This further adds to the inefficient use of system resources for making travel service reservations using traditional systems and further wastes a user's time and effort. Also, inputting personal information and payment information each time a user wants to reserve a given travel service subjects the user to certain security risks, such as having the user's personal information and payment information compromised and/or stolen.

Some subscription-based travel systems allow users to pay a subscription fee in order to access and reserve travel services. In these systems, the users are restricted to reserving a single travel service at a time. As a result, if a user reserves a given travel service far into the future, the user loses the value of the subscription-based travel systems for that period of time until the given travel service is consumed. In order to get the most out of the subscription, some users wait until just before they plan (e.g., users engage in last-minute booking) to travel before making a reservation on the subscription-based travel system. This can avoid losing access to the system while a given reservation far in the future is pending. While this approach generally works well, the amount of inventory and options left for the users to choose from when engaging in a last-minute booking can be limited as other users may have previously reserved the best available options for this period of time. Even still, after consuming the given travel service, the subscription-based travel systems prevent the user from reserving additional travel services for some period of time, such as seven days. As a result, these subscription-based travel systems fail to provide the maximum amount of benefit and enjoyment to their subscribers. This takes away from the overall appeal and enjoyment of having a subscription to such services, which leads to lack of use, disinterest among users, and waste of resources.

The disclosed examples improve the efficiency of using an electronic device by providing a better and more secure way for users to consume and access experiences (e.g., travel). Namely, the disclosed examples provide a subscription-based experience service that enables users to reserve experience-related resources (e.g., flights, hotels, car rentals, ticketed event purchasing, and so forth) regardless of when the experience-related resources start and based on a specified and set number of subscription value days during which access to the subscription-based experience is restricted or limited. In particular, disclosed examples can compute an amortized subscription parameter that is a function of the set number of subscription value days and use this amortized subscription parameter to search for and find experience-related resources having costs that satisfy the amortized subscription parameter. The amortized subscription parameter can represent a subscription cost accumulated over the number of subscription value days. Because the disclosed examples search for the experience-related resources based on the cost satisfying the amortized subscription parameter that is based on the set number of subscription value days, the amount of time during which access to the subscription-based experience service is restricted is not tied to the date on which the experience-related resource begins. This allows the subscription-based experience service to present opportunities and options to reserve experience-related resources that are far in the future (e.g., one or more years away) without compromising or degrading use and enjoyment of the subscription-based experience service.

In an example, the subscription-based experience service can receive input from a user to set the number of subscription value days to 15 days. This is the number of days the subscriber is willing to have access to the subscription-based experience service restricted (e.g., the subscription-based experience service prevents the user from reserving any other experience-related resources for a 15-day period of time measured starting from a date on which a given experience-related resource is reserved). The subscription-based experience service searches for any experience-related resource (having future experience dates that start in the near future, such as the next month, and/or the far future, such as in 10 months) that has a cost that satisfies the amortized subscription parameter computed based on the 15-day number of subscription value days. The subscription-based experience service presents options to reserve the experience-related resources that satisfy the search. In response to receiving input from a user to reserve a given one of the experience-related resources on a booking date, the subscription-based experience service prevents the subscriber from reserving a second experience-related resource during an in-use period (also referred to as a suspension period) that begins on the booking date and terminates after a 15-day period of time (e.g., a period of time corresponding to the number of subscription value days). This increases flexibility of accessing experiences via the experience subscription service and improves the overall user experience.

In this way, the subscription-based experience service, according to the disclosed examples, allows a user to search for experiences and make reservations for experience-related resources (e.g., such as hotels, rental cars, airfares, stays, homes/residences, experiential travel, guided tours, cruises, train fares, private aviation, "glamping", bespoke travel, event-based travel, and/or space travel) for a fixed annual or monthly subscription fee. The user who is a subscriber to the experience-based subscription service is authorized to make multiple reservations for experience-related resources without having to consider budgetary constraints or navigating through multiple checkout screens and can search through the experience-related resources very quickly with minimal delay. For example, a subscriber can, with one click of an on-screen button, select the desired experience-related resource to cause the subscription-based experience service to automatically reserve the experience-related resource. While certain examples are described with reference to experiences including travel services, similar functionality can be applied to other experiences, such as sporting event tickets, event tickets, concert tickets, entertainment tickets, and restaurant reservations. In such cases, a subscription service can be provided that allows a user to pay a monthly or annual subscription fee and make multiple reservations for sporting event tickets, event tickets, entertainment tickets, concert tickets, and restaurant reservations without having to consider budgetary constraints.

In some examples, the reservation service automatically identifies, curates, and generates a predetermined list of all of the best available experience-related resources including combining experience-related resources of different types for a specified future experience period or date range and destinations from which the user can select based on the user's subscription value. The reservation service automatically identifies and curates the list of best available experience-related resources having costs corresponding to subscription values computed for different numbers of subscription value days. For example, the reservation service can perform multiple iterations and passes to generate different combinations of experience-related resources that can be reserved in exchange for restricted access to the reservation service for different set numbers of subscription value days, such as 5 days, 10 days, 15 days, 30 days, or any other specified period of time. This way, when a user or the system selects a number of subscription value days, the reservation service can retrieve the corresponding list of experience-related resources that have been precomputed and determine to have costs that satisfy amortized subscription parameters corresponding to the number of subscription value days. This expedites the search process and improves the overall speed and efficiency of the computing device.

Each experience-related resource may be associated with a fixed or predetermined experience duration, such as three- or five-day stays at a hotel. Reserving a desired experience-related resource can be performed without navigating through multiple checkout and payment screens as the payment and user information needed to reserve the experience-related resource is performed using the subscription information and subscription payments (subscription cost) the subscriber makes over a fixed, repeated duration (e.g., daily or monthly or yearly). Specifically, the disclosed examples store, ahead of time, various personal information about a user in a user profile and receive subscription payments from the subscribers over the fixed, repeated duration or interval. In this way, the disclosed examples can very quickly automatically reserve and pay for a user-selected experience-related resource using the previously stored personal information and the previously provided subscription payments, avoiding the need to navigate the user through a checkout process. Also, pre-storing the user's information increases the overall security with respect to reserving experience-related resources as the user need not input personal and payment information each time the user desires to reserve a given experience-related resource.

In this way, the amount of time and effort the user has to spend searching for experience-related resources that meet the user's budget are significantly reduced. Also, by providing a single interface for reserving experience-related resources that automatically takes into account various experience-related resource costs, the number of steps, pages, and interfaces the user has to navigate through to reserve experience-related resources (e.g., travel services or hotel stays) are reduced. This provides a better way for a user to consume travel or access a variety of experience-related resources.

In some cases, the suspension period is computed as a function of the cost of the specified experience-related resource. Namely, an experience-related source that is associated with a first cost may result in a longer suspension period than another experience-related resource that is associated with a second cost that is lower than the first cost. In one example, the suspension period can be determined based on an amortized subscription value that is accumulated over a periodic time interval (e.g., daily, weekly, or monthly) for the subscriber. Namely, the suspension period (e.g., associated with one type of experience-related resource, such as rental cars) can be defined or determined by dividing the cost (e.g., the rate at which the subscription service pays for the experience-related resource rather than the off-the-shelf cost to a consumer) associated with the specified experience-related resource by the amortized subscription value (e.g., the daily cost of the subscription to the experience subscription service). In another implementation the suspension period (e.g., associated with another type of experience-related resource, such as hotels) can be determined based on a determination that the amortized subscription value falls within a value guard (e.g., minimum purchase amount and maximum cost) associated with the given experience-related resource.

This can result in a total number of subscription days that a subscriber needs to use (or have active) towards the subscription to accumulate a sufficient amount of subscription value to cover or correspond to the cost of the specified experience-related resource. In some examples, the total number of subscription value days (suspension period) can be rounded to the nearest greater whole day that is a factor of a predetermined number of days (e.g., 5 days or 10 days). Namely, if the resulting total number of subscription days is 6 days, that value can be rounded to 5 days to provide the suspension amount. This results in a suspension period of 5 days that will be associated with the subscriber in response to receiving input that reserves the specified experience-related resource. The suspension period begins on the current day and ends on a date that exceeds the current day by the suspension amount (e.g., 5 days) that has been computed. Specifically, the subscriber can be prevented from reserving additional experience-related resources starting from the current date until 5 days later. After 5 days have elapsed since the current date, the experience subscription service allows the subscriber to reserve one or more additional experience-related resources.

In some implementations, the experience subscription service allows the subscriber to search and/or filter a list of available experience-related resources based on a desired or specified suspension period. In such cases, the experience subscription service receives the specified suspension period and computes a suspension value by determining the total cost of the subscription or the total accumulated value of the subscription over the suspension period that is specified. For example, the experience subscription service can multiply the amortized subscription value (e.g., the daily subscription cost) by the specified suspension period to determine or generate the suspension value. The experience subscription service can then obtain a list of costs or maximum purchase amounts associated with a plurality of experience-related resources to identify candidate experience-related resources that have a cost or maximum purchase amount that is lower than the suspension value. The experience subscription service presents the candidate experience-related resources in a graphical user interface. The experience subscription service can receive a selection of one of the candidate experience-related resources and, in response, the experience subscription service automatically reserves the selected candidate experience-related resource and suspends the account (or prevents the subscriber from reserving any other experience-related resource) for a period of time corresponding to the specified suspension period.

FIG. 1 is a block diagram illustrating a networked system 100 for a subscription-based experience service, according to some examples. The system 100 includes one or more client devices such as client device 110. The client device 110 comprises, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some examples, the client device 110 comprises a display module to display information (e.g., in the form of graphical user interfaces). In further examples, the client device 110 comprises one or more of touch screens, accelerometers, gyroscopes, cameras, microphones, global positioning system (GPS) devices, and so forth. The client device 110 may be a device of a user that is used to access and utilize subscription-based experience services via an experience services system 124 implemented by an application server 102. The experience services system 124 can be accessed by the client device 110 to book or reserve one or more experience-related resources (e.g., flights, hotel stays, events, space travel, travel goods, and so forth).

For example, the client device 110 may be used by a user (or subscriber) to navigate to a website of the experience services system 124. In some examples, the client device 110 may include a dedicated experience services system 124 application with the same or similar functionality as the website. After accessing the website, the user inputs personal information (e.g., name, address, phone number, payment information, and so forth) to subscribe to the experience services system 124. In some examples, the subscription fee is paid monthly but can be paid on any other periodic interval (e.g., weekly, daily, every other month, annual, lifetime, and so forth). The periodic interval over which the subscription fee is paid defines the amortized subscription value. Namely, the amortized subscription value is the amount of fees collected by the experience services system 124 from the subscriber over a defined period (shorter than the annual subscription, such as over a specified number of days, also referred to as the number of subscription value days). In an implementation, to compute the amortized subscription value, the experience services system 124 receives, selects, or sets a quantity or number of subscription value days, determines the daily value of the subscription (e.g., by dividing the annual subscription cost by 365 days), and multiplies the daily value by the quantity of subscription value days. After subscribing to the experience services system 124, the subscriber is provided with login credentials that can be used to navigate and browse available experience-related resources (or experiences) on the experience services system 124. For example, the user can access the experience services system 124 to browse hotel rooms available in various luxury categories in a selected geographical location at a particular date or range of dates in the future. In some cases, users only need login credentials to reserve a given experience-related resource but are free to browse the available inventory without a subscription.

In some examples, the client device 110 presents a graphical user interface with data entry regions allowing the user to select from a predefined list of travel destinations (e.g., geographical locations). In some examples, the graphical user interface allows the user to manually type in a name of a desired geographical location. As the user types in the name of the desired geographical location, the experience services system 124 searches through available travel destinations and presents the available travel destinations to the user for selection.

In response to receiving a user selection of one or more of the travel destinations, prior to or during selection of the destination, the client device 110 presents a data entry region for the user to input one or more specific experience start dates (e.g., an arrival date at the hotel or the departure date of a flight) and/or a number of days for the trip. The client device 110 can also receive input from the user specifying a number of subscription value days. The number of subscription value days can specify the amount of time a subscriber agrees to have access to the experience services system 124 restricted, such that an additional reservation of an experience-related resource cannot be made. The subscriber agrees to this specified amount of time in exchange for reserving a given experience-related resource having a future experience date and having a cost that corresponds to an amortized subscription value computed based on the specified amount of time.

In some examples, the list of available experience-related resources is automatically searched for on a daily basis without receiving the user selection of the travel destination, number of subscription value days, and/or travel start date. The experience services system 124 retrieves subscription information for the user specifying the amount the user pays on a monthly basis or other periodic basis (e.g., daily, weekly, yearly, lifetime, and so forth). Using the subscription information, the experience services system 124 computes a subscription value as a function of the booking date and the travel date. The booking date may be computed based on the current date on which the user selection of the travel destination is received and/or the current date on which a list of travel services is searched and curated. The experience services system 124 utilizes the subscription value and a value guard to search for travel services that satisfy the subscription value and the value guard. The value guard is used as a filter of experience-related resources to ensure that the experience-related resource options presented to the user have a cost and/or value that satisfies a minimum travel value amount and does not exceed a maximum purchase amount.

In an example, the experience services system 124 can generate various combinations of experience-related resources having costs corresponding to different subscription value days. For example, the experience services system 124 can compute a first amortized subscription amount based on a first number of subscription value days (e.g., 5 days) and can search for a first set of combinations of experience-related resources having respective costs that are less than or otherwise correspond to the first amortized subscription amount. Similarly, the experience services system 124 can compute a second amortized subscription amount based on a second number of subscription value days (e.g., 15 days) and can search for a second set of combinations of experience-related resources having respective costs that are less than or otherwise correspond to the second amortized subscription amount. This enables the experience services system 124 to quickly provide and update matching results to the client device 110 for presentation of the results in the graphical user interface using one or more interactive visual representations based on any selected experience start date and any specified number of subscription value days. The graphical user interface of the client device 110 may be utilized to access reviews, comments, and additional information for each of the experience-related resources represented by the interactive visual representations.

The client device 110 receives a user input selecting one of the interactive visual representations for an experience-related resource and communicates the selection to the experience services system 124. The experience services system 124 automatically reserves the experience-related resource (e.g., holds and pays for a room at a hotel) corresponding to the selected interactive visual representation. The client device 110 may present a confirmation page to the user informing the user of the experience-related resource that has been reserved and the future experience start date.

In some cases, the user can navigate to a cancelation page or graphical user interface using the client device 110 and cancel any reservations previously selected within a cancelation window (e.g., within 72 hours prior to the travel start date). In response to receiving a user request to cancel the experience-related resource, the experience services system 124 may cancel the reservation and the client device 110 may allow the user to search for a new experience-related resource in a similar manner as before.

In some implementations, the experience services system 124 presents an indicator of a corresponding number of subscription value days (e.g., a suspension period) for each of the experience-related resources presented in the graphical user interface. The indicator informs the user that the user can reserve the corresponding experience-related resource and have access to the experience services system 124 restricted for an in-use period of time corresponding to the number of subscription value days. During the in-use period of time when the access is restricted (or suspended), the user is prevented from reserving any other experience-related resource. This in-use period of time can begin on the date that the experience-related resource is reserved or booked and after a period of time corresponding to the number of subscription value days. For example, the indicator can specify that a given hotel is associated with subscription value days corresponding to 15 days. In response to receiving input from the subscriber on a given date (e.g., April 10) to reserve the given hotel, access to the experience services system 124 is restricted (preventing the subscriber from reserving an additional experience related resource) for 15 days, such as until April 25. In this case, a status of the subscriber in the experience-based subscription service is transitioned from an available state to an in-use state. In an example, the restriction is automatically removed 15 days after the date the given hotel is reserved, after which full access to the experience services system 124 resumes. Specifically, the experience services system 124 automatically transitions the status of the subscriber in the experience-based subscription service from the in-use state to an available state in response to determining that the amount of time between the current date and the booking date exceeds the number of subscription value days. In the available state, the experience services system 124 enables or allows the subscriber to browse additional experience-related resources and reserve a new experience-related resource.

In some cases, all of the experience-related resources presented in the graphical user interface can be associated with respective number of days (in-use periods) that are the same or different. In some implementations, the experience services system 124 allows the user to input a desired number of subscription value days or to define the in-use period (e.g., by selecting from predetermined periods or specifying a custom period, such as using a slider). The experience services system 124 can receive input from a user that specifies a range for the subscription value days including a minimum quantity of subscription value days and/or a maximum quantity of subscription value days. The experience services system 124 computes a subscription amortization parameter based on the specified range of the subscription value days. The subscription amortization parameter can define a minimum accumulated subscription value and a maximum accumulated subscription value based on the number of subscription value days in the range.

For example, the experience services system 124 can obtain an amortized subscription value of the subscriber by determining how much subscription fees are accumulated over one repetition of a repeated time interval (e.g., how much one day's worth of subscription costs the subscriber). The experience services system 124 can then multiply the amortized subscription value (e.g., the daily cost of the subscription) by the minimum quantity of subscription value days to determine the minimum accumulated subscription value. The experience services system 124 can then multiply the amortized subscription value (e.g., the daily cost of the subscription) by the maximum quantity of subscription value days to determine the maximum accumulated subscription value.

The experience services system 124 searches available experience-related resources to identify a subset of experience-related resources that are associated with a cost that is within the range of the subscription amortization parameter (e.g., to identify those experience-related resources that satisfy the subscription amortization parameter). Namely, the experience services system 124 searches available experience-related resources to identify a subset of experience-related resources that are associated with a cost that is greater than the minimum amortized subscription value and lower than the maximum amortized subscription value which have been computed based on the range of the subscription value days. In some cases, the user need only input a maximum or a minimum value for the range of the subscription value days and the parameter that is missing is automatically determined and populated. The experience services system 124 presents the identified subset of experience-related resources to the user with an indication of the corresponding in-use periods (which can be greater than, less than or equal to the desired range of the number of subscription value days input by the user). The experience services system 124 can receive a user selection of one of the presented experience-related resources and, in response, reserves the selected experience-related resource and restricts access to the account for the user for the in-use period that begins on the date the selection to reserve the experience-related resource is received. In an example, the experience services system 124 can restrict access by transitioning a status of the account or the subscriber to an in-use state. The in-use state allows the subscriber to browse additional experience-related resources without reserving any of the additional experience-related resources.

In some examples, the in-use period can be modified (increased or decreased) based on a classification of a user. Specifically, a first user classified as very active (e.g., as determined by a machine learning model) may be associated with or assigned a longer in-use period than a second user that is classified as less active than the first user. Specifically, the same experience-related resource can be associated with different in-use periods for different users based on their respective classification. For example, a first experience-related resource can be associated with a first in-use period (10 days) for first and second users. The experience services system 124 can determine that the first user is associated with a first classification (e.g., is a very active user) and that the second user is associated with a second classification (e.g., is less active than the first user or is less active than a threshold). In such cases, in response to determining that the first user is associated with the first classification, the experience services system 124 can increase the in-use period by a specified amount (e.g., 3 days) and present to the first user the first experience-related resource with the increased in-use period (e.g., 13 days). In response to determining that the second user is associated with the second classification, the experience services system 124 can decrease the in-use period by another specified amount (e.g., 2 days) and present to the second user the first experience-related resource with the decreased in-use amount (e.g., 8 days).

The experience services system 124 only allows the user to reserve an additional travel service after the in-use period elapses (e.g., 10 days after the date of the experience-related resource has been reserved). In some cases, if the user is allowed to reserve multiple travel services concurrently, the experience services system 124 only allows the user to reserve an additional travel service that begins (has a start date) that follows the date of a reserved experience-related resource by the in-use amount (e.g., the user can only reserve another experience-related resource that has a start date that is more than 10 days after the date of a given experience-related resource has been reserved—the booking date of the experience-related resource).

In some examples, the experience services system 124 allows a user to cancel a given reservation for an experience-related resource during the in-use period and/or after the in-use period elapses. In such cases, the experience services system 124 computes an accumulated days credit to offset a future number of subscription value days. Specifically, the experience services system 124 can credit a user's account based on an amount of time that the account was in the in-use state in which the user was restricted from reserving additional experience-related resources. This credit can be used to offset or reduce an in-use period associated with a future reservation. For example, the experience services system 124 can determine that a given experience related resource is associated with a 15 day in-use period. In response to receiving input to reserve the given experience-related resource, the experience services system 124 begins restricting access to the experience services system 124 to prevent the user from reserving additional experience-related resources.

In one example, during or after the in-use period, such as 10 days after receiving the booking request for the given experience-related resource, the experience services system 124 can receive input from the user that cancels the reservation for the given experience-related resource. In this case, the experience services system 124 computes the amount of time remaining before the future experience date of the given experience-related resource begins (e.g., by computing a difference between a current date and the future experience start date of the given experience-related resource). The experience services system 124 compares the amount of time to a threshold value, such as 30 days. In response to determining that the amount of time exceeds the threshold value, the experience services system 124 computes the accumulated days credit based on the amount of time the account of the user was in the in-use state. In this case, the request to cancel was received 10 days after booking the reservation, which results in a 10-day credit added to the accumulated days credit. In response to determining that the amount of time falls below or fails to exceed the threshold value, the experience services system 124 computes the accumulated days credit based on a fraction (e.g., 80 percent) of the amount of time the account of the user was in the in-use state. In this case, the request to cancel was received 10 days after booking the reservation but is less than 30 days before the start date of the given experience-related resource. This results in an 8-day credit added to the accumulated days credit rather than the full 10-day credit. The fraction used to compute the accumulated days credit can be based on a user classification which is automatically determined by a trained machine learning model, discussed below. For example, the fraction can be a first value (e.g., 80 percent) for a user classified as inactive or with low activity level and can be a second value (e.g., 50 percent) for a second user classified as an active user. In some cases, the fraction can be zero resulting in no accumulated days credit being provided if the experience-related resource is canceled within a specified period (e.g., 30 days) of the start date of the experience-related resource.

In the process of restricting access to an account when a request to reserve a given experience-related resource is received, the experience services system 124 can obtain the accumulated days credit associated with the account. The experience services system 124 can allow the user to choose by providing input to offset or reduce an in-use period by the accumulated days credit or can automatically offset or reduce the in-use period by the accumulated days credit. For example, a given experience-related resource can be associated with a 15 day in-use period (e.g., a 15-day subscription value days amount). In response to receiving a request to reserve the given experience-related resource, the experience services system 124 restricts access to the experience services system 124 for the user for a shorter period of time (e.g., 5 days instead of the associated 15 days when the accumulated days credit includes 10 days) based on the amount of time available in the accumulated days credit.

The experience services system 124 provides an improved, more secure, seamless, and better way for users to reserve and consume experience-related resources, such as travel. The experience services system 124 performs such improved techniques in three phases or steps. Initially, in the first phase or step, the experience services system 124 generates an inventory of experience-related resources or services by searching experience destinations across a range of date or dates throughout the year. The experience destinations are searched from publicly available information sources (e.g., databases of other experience sites available to non-subscribers of the experience services system 124), by direct access to a predetermined set of experience services, third-party sources, proprietary sources, and experience services that have direct relationships and contracts for experience services with the experience services system 124. The experience destinations are searched periodically (e.g., nightly or weekly) and using various combinations of future experience dates and destinations. The search returns experience-related resources or services available at various dates throughout the world and includes the total cost for consuming or accessing the experience-related resources or services on the particular combination of dates along with the cancelation policy of each experience-related resource or service. The cancelation policy may indicate the fee for canceling the experience-related resource or service once booked, which may be free or a nominal charge. As a result, the output of phase one or step one is a collection or database of tens of millions of combinations of experience-related resources or services (and experience resource types), at different ranges of future experience start dates, with corresponding prices or costs, and with corresponding cancelation policies.

After the first phase or step, the experience services system 124 performs a second step or phase. In the second step or phase, the collection of the experience services identified in the first phase is curated or filtered in accordance with one or more rules. Specifically, any, all or a combination of the information associated with each experience service (e.g., the experience start dates, the prices, the experience-related resource type, the destination, and the cancelation policy) is analyzed and compared with the one or more rules to exclude and select a list of candidate experience services. In an example, the rules include three criteria (e.g., the booking date or date on which the reservation for a given experience-related resource is made or requested, the price with taxes and fees (cost of the reservation), and the cancelation fee or policy, which are used to curate or filter the collection of experience services. The rules may vary between users or may be uniform for all users and subscribers of the experience services system 124.

Specifically, the rules consider how much the experience services system 124 is willing or allowed (e.g., the maximum purchase amount) to spend for a given experience-related resource or service which is leveraged against how far in advance the reservation is being made (e.g., the difference between the booking date and the future experience start date) and/or the number of subscription days needed independent of the start date of the experience-related resource. The maximum purchase amount may be computed based on two factors of payments received (e.g., the amount a subscriber will actually end up paying from the booking date to the experience date and an amortized amount by week or day of the subscriber's subscription cost). Specifically, the amount the subscriber will actually end up paying may be computed by determining how many subscription cycles or how many payments will be collected between the booking date and the experience start date. For example, the subscriber pays monthly on the first day of every month, the booking date is in the middle of a given month, and the experience start date is two months from the booking date. In such cases, the subscriber will end up paying two cycles of subscription fees—two monthly payments—by the time the experience starts. The amortized amount is less granular and represents on a repeated time interval (e.g., daily, monthly, weekly, hourly) basis how much the subscriber would end up paying. The maximum purchase amount is then offset by a margin which may be positive or negative. The margin may vary based on how far in advance the reservation is being made (e.g., the difference between the booking date and the experience start date). The margin may vary based on the type of experience-related resource or service being booked or reserved. For example, the margin may be greater for experience-related resources or services that include or relate to cruises and smaller for experience-related resources or services that include or relate to homes/residences.

The experience services system 124 computes a minimum experience value representing the maximum a given user would be willing to pay for the experience service. This may be computed as a percentage (e.g., 80%) of the amount the subscriber would have paid by the time the experience begins. Specifically, the amount is a percentage of the number of subscription cycle payments the subscriber would have made by the experience start date starting from the booking date. This amount is used to remove any experience services that have a cost that is less than the minimum experience value as the subscriber can shop those experience services independently of being a subscriber to the experience services system 124. The experience services system 124 eliminates any duplicates from the experience services and maintains those experience services that have a maximum duration of experience dates or a duration that corresponds to a selected number of subscription value days.

The experience services system 124 searches the actual price (value) or cost of the various experience services and applies a margin to the cost of each experience service. The margin may be positive or negative and may depend on how far in advance the experience date is relative to the booking date. The experience services system 124 filters any experience service that has a cost that exceeds the maximum purchase amount and filters any experience service that has a cost that is below the minimum travel value. The experience services system 124 applies an additional filter based on cancelation policies of experience services that do not satisfy a given cancelation policy criteria.

As discussed above, the experience services system 124 forms various combinations of experience-related resources based on different in-use periods or different number of subscription value days. Some experience-related resources can be associated with costs that are within a first range of subscription value days (e.g., 15 days). Other experience-related resources can be associated with costs that are within a second range of subscription value days (e.g., 10 days).

In some examples, the experience services system 124 presents the filtered list of experience-related resources or services as options for the user or subscriber to select to make a reservation or booking. The user can further filter the list based on various criteria (e.g., experience dates, experience destinations, in-use periods, subscription value days, etc.). In some examples, the experience services system 124 presents to a user a comparison of each experience service that is presented against what is available for the same experience service on a publicly available or other travel site. Specifically, the experience services system 124 presents, next to each experience service or next to a portion of experience services, an identification of another booking experience site that has the same experience service and the estimated value for booking that same experience service on the other booking experience site. This value that is presented for comparison may be retrieved from storage based on what is in the collection that is analyzed and filtered to generate the list and/or may be determined automatically by accessing the other experience site, executing a search for the particular experience service and the particular range of experience dates, and retrieving the cost presented on the other experience site based on the executed search.

In some examples, the experience services system 124 presents, next to each or a subset of the experience-related resources, an associated in-use period for that particular experience-related resource. The experience services system 124 can compute the suspension period as a function of the cost of the particular experience and the total amount of amortized subscription costs that need to be collected to cover the cost of the particular experience (optionally offset by a specified margin). For example, if a particular experience costs $1000 and the subscriber pays $3000 per month to the experience services system 124, the amortized subscription cost on a daily basis is $100 ($3000/30(days)). As such, to cover the cost of the particular experience, 10 days' worth of the daily subscription cost or value needs to be collected or accounted for in computing the suspension period. In some cases, the in-use period for this particular experience can be set to 10 days, meaning that the subscriber is prevented from reserving any other additional experience-related resource or service if the subscriber elects to reserve this particular experience. In some implementations, a margin is applied to the in-use amount (e.g., based on a type of subscription, type of experience-related resource, or subscriber classification). The margin can be determined to be three days, and in such cases the in-use period is increased by the margin to be 13 days. After the in-use period ends (and prior to the start date of the particular experience-related resource), the experience services system 124 allows the subscriber to reserve one additional experience-related resource which can or cannot include an additional suspension period.

In some examples, the experience services system 124 enables the user to apply a filter or search the filtered list of experience-related resources or services based on a desired in-use period. For example, the subscriber can select from a predefined list of periods or input a custom period, such as using a slider to define a minimum and/or maximum number of subscription value days. The experience services system 124 can compute an in-use period for each of the filtered list of experience-related resources based on the cost of that experience-related resource and the amortized subscription value of the subscriber (e.g., the daily cost of the subscriber's account or subscription). The experience services system 124 can then find or identify which of the filtered list of experience-related resources have a computed in-use period that is shorter than or meets the desired in-use period and can present such experience-related resources to the subscriber. The experience services system 124 can automatically sort the experience-related resources by one or more factors (e.g., the distance of the destination relative to a home location of the subscriber and the duration of the in-use period where experience-related resources with shorter in-use periods are prioritized or displayed above other experience-related resources with greater or longer in-use periods).

In some cases, the experience services system 124 can generate a package of multiple experience-related resources. Each package includes more than one experience-related resource, and the package can be associated with a single in-use period. Individual experience-related resources in the package by themselves can be associated with in-use periods or costs that fail to satisfy a specified subscription value days amount. However, when combined into a package, their respective costs can be aggregated, and their respective in-use periods can be combined to provide a package with an in-use period that satisfies the specified subscription value days amount.

One or more users may be a person, a machine, or other means of interacting with the client device 110. In examples, the user may not be part of the system 100 but may interact with the system 100 via the client device 110 or other means. For instance, the user may provide input (e.g., touch screen input or alphanumeric input) to the client device 110 and the input may be communicated to other entities in the system 100 (e.g., third-party servers 130, server system 108, etc.) via a network 104. In this instance, the other entities in the system 100, in response to receiving the input from the user, may communicate information to the client device 110 via the network 104 to be presented to the user. In this way, the user interacts with the various entities in the system 100 using the client device 110.

The system 100 further includes a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via a web client 112 (e.g., a browser, such as the Internet Explorer® browser developed by Microsoft® Corporation of Redmond, Washington State) or one or more client applications 114. The client device 110 may include one or more client applications 114 (also referred to as "apps") such as, but not limited to, a web browser, messaging application, electronic mail (email) application, an e-commerce site application, a mapping or location application, an online home buying and selling application, a travel services application, a real estate application, and the like.

In some examples, one or more client applications 114 are included in a given one of the client device 110, and configured to locally provide the user interface and at least some of the functionalities, with the client application 114 configured to communicate with other entities in the system 100 (e.g., third-party servers 130, server system 108, etc.), on an as-needed basis, for data and/or processing capabilities not locally available (e.g., to access location information, to access travel services information, such as cost and availability, to authenticate a user, to verify a method of payment, etc.). Conversely, one or more applications 114 may not be included in the client device 110, and then the client device 110 may use its web browser to access the one or more applications hosted on other entities in the system 100 (e.g., third-party servers 130, server system 108, etc.).

A server system 108 provides server-side functionality via the network 104 (e.g., the Internet or WAN) to one or more third-party servers 130 and/or one or more client devices 110. The server system 108 includes an application server 102 that implements an application program interface (API) server 120, a web server 122, and an experience services system 124, that may be communicatively coupled with one or more databases 128. The one or more databases 128 may be storage devices that store data related to users of the system 108, applications associated with the system 108, cloud services, travel services data, one or more machine learning techniques and so forth. The one or more databases 128 may further store information related to third-party servers 130, third-party applications 132, client devices 110, client applications 114, users, and so forth.

In one example, the one or more databases 128 may be cloud-based storage. The one or more databases 128 may store subscription information for one or more users of the experience services system 124. The subscription information may identify users of the experience services system 124, the specified period of in-use time (period of time that is added after a booking date of when a user reserves a given experience-related resource with an in-use period; this can be stored as a suspension end date which indicates the date after which the subscriber can begin making additional experience-related resource reservations), a subscription status (e.g., in-use state or available state), accumulated days credit (e.g., due to reservation cancelations) which can be used to offset future suspension or in-use periods, the subscription start dates of the users, the subscription fee of the users (and/or amortized subscription value), the total amount paid to date for a subscription of the users, and one or more experience services activities of the users. The experience services activities may include any combination of the number of reservations made in a given time period (e.g., within a given subscription year) by each user, the subscription duration (e.g., measured from the subscription start date to the present date) of each user, the booking duration (e.g., measured from the booking date to the experience date) of each user, the distance to the travel destination of each user (e.g., measured from an address of the user and the location of reserved experience destinations), the margin amount (e.g., how much profit was made in aggregate during the course of the subscription) for each user, the cancelation frequency (e.g., how often the user cancels a reservation made), suspension period(s) of each subscriber, and/or the reservation frequency (e.g., how much time elapses on average between the end of one reservation and the start of another).

The one or more databases 128 may store the reservations (e.g., the destination and the experience start date and/or duration) of experience services of each user or subscriber of the experience services system 124. The one or more databases 128 may store a list of all available, or a selected set of, experience-related resources or services in one or more geographical regions or destinations along with reviews and/or detailed information about the experience services. In some cases, the databases 128 use a search index to make searching faster which improves the overall efficiency of the device. The one or more databases 128 may store first and second costs on a nightly basis or on some other periodic interval (e.g., per six night basis) for each experience service. The first cost that is stored in the one or more databases 128 may represent the cost for the experience service that is provided to non-subscribers of the experience services system 124 and that is available by directly making the reservation through a dedicated server of the experience service and/or by making the reservation through an existing experience service search interface. The one or more databases 128 may access a dedicated existing experience service search interface on a periodic basis (e.g., nightly or weekly) to obtain and download the first cost (value) of each, or a selected set, of experience services. The first cost may be computed by selecting a specified experience duration (e.g., six nights) and multiplying the per night rate (provided by the travel service) by the specified experience duration. The second cost of each experience service may be a dedicated cost that is changed on an annual or monthly basis and is provided by contract between the experience services system 124 and the corresponding experience service. The second cost (value) may only be available to users who subscribe to the experience services system 124. The second cost of each experience service may represent the cost for consuming the experience service during a specified travel duration (e.g., six nights).

The one or more databases 128 may store the cancelation policy of each experience service indicating how much time in advance of the reservation start date at a given experience service the experience service reservation can be canceled without penalty (e.g., to receive a full refund or full accumulated days credit or partial accumulated days credit, such as based on classification of the user). The one or more databases 128 may store the cost for canceling a given experience service outside of the cancelation policy. The one or more databases 128 may store an expected margin on a per user basis. The one or more databases 128 may store an associated minimum in-use period of each experience or a precomputed in-use period of each experience that specifies how long a subscriber's account is prevented from making additional reservations if the subscriber books the given experience. The expected margin may increase over time (e.g., for subscribers classified as very active) or decrease over time (e.g., for subscribers classified as not very active). The expected margin may change by a predetermined factor based on a difference between a booking date and an experience start date (e.g., the margin may change based on how far in advance a user is making the reservation). This may be used to reduce the maximum purchase amount by a first factor if the reservation is made less than a predetermined number of days in advance of the experience date. This may be used to increase the maximum purchase amount by a second factor if the reservation is made more than a predetermined number of days in advance of the experience date.

The server system 108 may be a cloud computing environment, according to some examples. The server system 108, and any servers associated with the server system 108, may be associated with a cloud-based application, in one examples.

The server system 108 includes the experience services system 124. The experience services system 124 includes one or more modules, storage devices, and databases. The storage devices in the experience services system 124 store various experience services activities for each user, experience services activities training data, and one or more machine learning techniques for classifying users of the experience services system 124 and/or to estimate suspension periods or suspension period offsets for particular users based on their experience activities. The modules in experience services system 124 are configured to compute components of a subscription value, compute value guards, compute in-use periods, and search for available experience services to provide to the client device 110 in response to receiving a request for experience services at a given destination and time frame. The modules in experience services system 124 are configured to receive a user selection of one of the experience services matching the request and reserve the selected experience service for the user and apply a given in-use period to the user's account if one is associated with the reserved experience. The modules in experience services system 124 are configured to determine whether the number of pending reservations for a given user exceed an allowable number of pending reservations (e.g., more than one, or more than three) or if the given user is currently in an in-use period (e.g., the current date precedes a suspension period end date) and in response, prevent the user from making further reservations until the number of pending reservations is below the allowable number (e.g., by canceling a pending reservation or waiting for the reservation to expire or be consumed) or when the in-use period elapses (the current date is later than the suspension period end date).

The modules in experience services system 124 are configured to train a machine learning technique to classify a given user or subscriber using the travel services activities of the user or subscriber by establishing relationships between known travel services activities and known or manually assigned classifications to users or subscribers. The modules in experience services system 124 are configured to filter the available travel services provided to a given client device 110 based on the classification of the user of the client device 110 and/or cancelation policies of the various travel services. In some cases, the modules in the experience services system 124 are configured to increase or decrease a given in-use period associated with a given experience-related resource or service based on the classification of the given user or subscriber. In some cases, the modules in the experience services system 124 are configured to increase or decrease a fraction used to compute an accumulated days credit (e.g., due to canceling a reservation within less than a threshold period of time before the associated experience-related resource starts) based on the classification of the given user or subscriber. The details of the experience services system 124 are provided below in connection with FIG. 2.

The system 100 further includes one or more third-party servers 130. The one or more third-party servers 130 may include one or more third-party application(s) 132. The one or more third-party application(s) 132, executing on third-party server(s) 130, may interact with the server system 108 via API server 120 via a programmatic interface provided by the API server 120. For example, one or more the third-party applications 132 may request and utilize information from the server system 108 via the API server 120 to support one or more features or functions on a website hosted by the third party or an application hosted by the third party. The third-party website or application 132, for example, may provide software version analysis functionality that is supported by relevant functionality and data in the server system 108.

Third-party servers 130 may include an existing non-subscription-based experience service. Such non-subscription-based experience services can be used to search for experience services at a first cost available to non-subscribers of the experience services system 124. The experience services system 124 may query the third-party servers 130 on a periodic basis to obtain the first costs for the experience services provided by the experience services system 124. In an example, the first costs may represent a per-night rate of the experience services multiplied by a predetermined number of nights (e.g., six nights).

Figure 2:
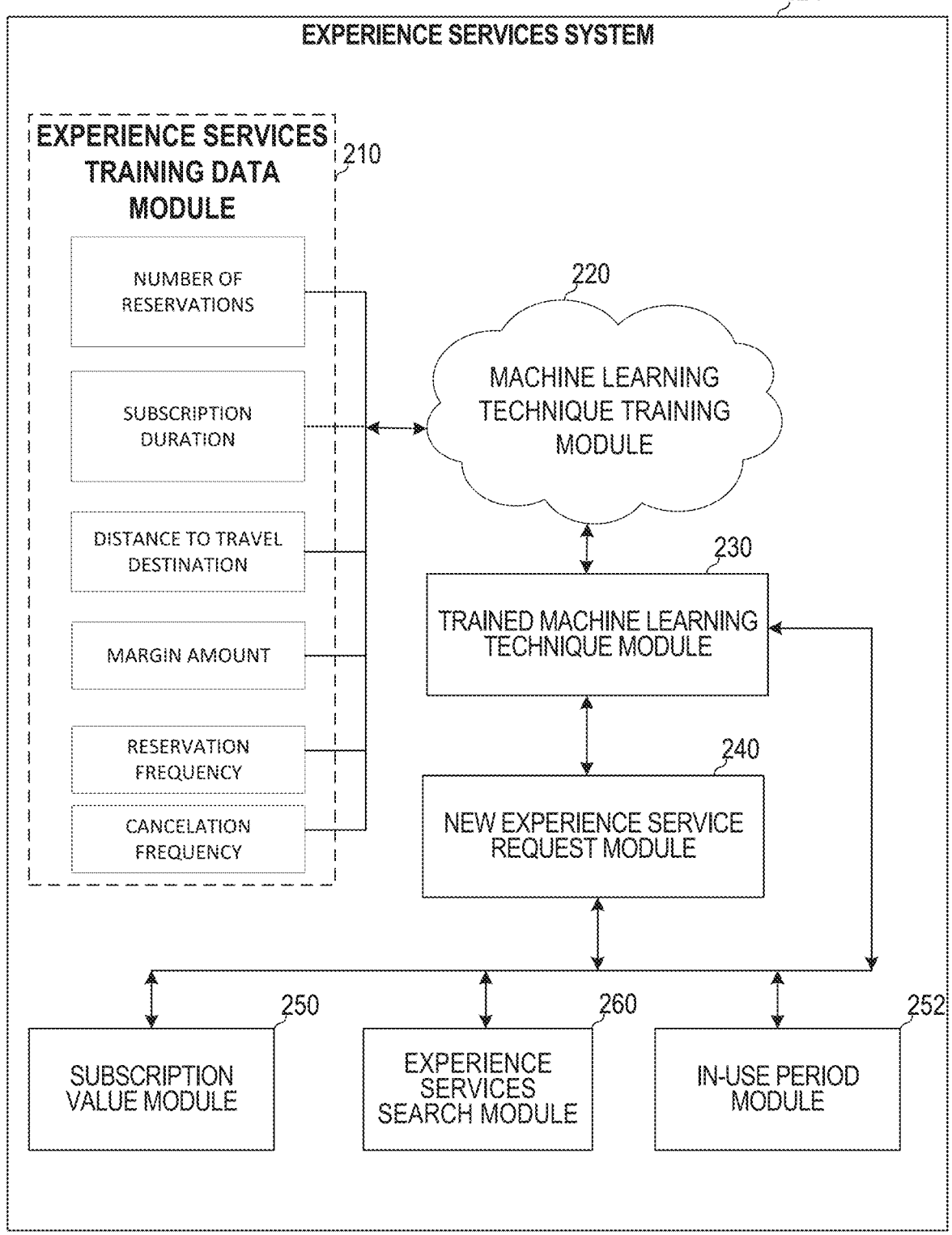
FIG. 2 illustrates an experience services system, according to some examples.

FIG. 2 illustrates the experience services system 124, according to some examples. The experience services system 124 includes an experience services training data module 210, a machine learning technique training module 220, a trained machine learning technique module 230, a new experience service request module 240, a subscription value module 250, an experience services search module 260, and an in-use period module 252. In some implementations, some modules of the experience services system 124 may be implemented on server system 108 and others may be implemented on third-party servers 130 or client device 110. In some implementations, all of the modules of the experience services system 124 are implemented on server system 108, on third-party servers 130, or on client device 110. In such cases, server system 108 communicates information to third-party servers 130 based on the modules implemented and vice versa.

The new experience service request module 240 may communicate with the client device 110 to receive parameters and criteria for a new experience service request. For example, via the graphical user interface of the client device 110, the user can select a travel destination or geographical location and can, optionally, input one or more desired experience start dates (such as be interacting with a graphical user interface that includes a calendar and selecting one or more days as the one or more start dates), one or more end dates (e.g., using the calendar presented in the graphical user interface), experience length, and/or range of or quantity of a number of subscription value days (e.g., defining an in-use period). The new experience service request module 240 may communicate this user selection to the experience services search module 260 to identify a list of available experience-related resources. The new experience service request module 240 may communicate an identifier of the user of the client device 110 to the subscription value module 250.

In some examples, the parameters are automatically determined and computed on a nightly basis and used to curate a list of travel services over the course of a given user. In such cases, the user may enter an experience destination and the curated list is presented with previously selected experience future dates (e.g., experience dates not inputted or selected by the user). In such cases, the new experience service request module 240 may, on a periodic basis (e.g., nightly) retrieve a subscription value for one or more users and one or more experience destinations and provide these as the selection to the experience services search module 260. In this way, the experience services search module 260 identifies available experience-related resources across a range of dates for one or more users and curates such a list for subsequent presentation to the user. In this way, the user can simply enter a desired destination, and the available and curated list of experience-related resources at the destination, together with the available experience dates and associated in-use periods, are presented to the user.

The experience services search module 260 may communicate with the subscription value module 250 to obtain the subscription value for the user of the client device 110. The subscription value module 250 may communicate with the databases 128 to obtain the booking date and the subscription cost of the identified user. The booking date may be the current date indicating when the search module 260 conducts the search for available experience-related resources and/or the date on which the user request to view available experience-related resources is received from the new experience service request module 240. The subscription value module 250 may compute the subscription value based on two parameters: an aggregated subscription cost parameter and an amortized subscription cost parameter. In an example, the subscription value module 250 computes the subscription value as an average of the aggregated and the amortized subscription cost parameters.

For example, based on the data provided by the user, the subscription value module 250 may determine that the experience is scheduled to start 10 weeks from the present time. In such cases, the subscription value module 250 computes an estimate of the total amount the user will pay for the subscription by aggregating the total amount that will be paid from the present time until 10 weeks from the present time. Namely, the subscription value module 250 assumes the user will continue paying for the subscription until the travel start date from the booking date and estimates how much the user would have paid for the subscription from the current booking date until the future experience start date. As an example, if the subscription costs $2500 per month, the subscription value module 250 may determine that the experience will start 10 weeks from the present day and, in the next 10 weeks, three months' worth of subscription fees (e.g., $7500) will be paid (assuming the fee is paid on the first day of every month). Accordingly, the subscription value module 250 may compute, as the aggregated subscription cost parameter of the subscription value $7500, that will be paid from the present time (the booking date) until the trip start time. In some cases, the user needs to be an active subscriber at the time the experience-related resource begins. In this way, not all of the monthly subscription costs need to be associated with the experience-related resource as the resource can be reserved with a fewer number of subscription value days.

The subscription value module 250 may also compute as the subscription value an amortized amount of the subscription cost over an annual basis. For example, the subscription value module 250 may determine the total cost of the subscription for the entire year to be $30,000 (e.g., by multiplying the number of months in a year, 12, by the monthly subscription fee, $2500). The subscription value module 250 may amortize the yearly subscription cost on a specified repeated periodic (e.g., daily, monthly, hourly, weekly) basis to determine the amount of the subscription paid from the booking date until the experience start date. For example, if the trip is planned to start in 10 weeks, the subscription value module 250 computes, as the amortized subscription cost parameter of the subscription value, a total of 10 weeks' worth of the weekly subscription cost as $5,769 (e.g., annual subscription fee $30,000 divided by 52 weeks per year and multiplied by 10 weeks).

The subscription value module 250 may compute the subscription value as a function of the aggregate subscription cost expected to have been paid by the time the experience starts and the amortized subscription cost by the time the experience starts as measured from the booking date. For example, if the user plans the trip to start in 10 weeks from today (the booking date), the subscription value module 250 computes an average of $7,500 and $5,769. As another example, the subscription value module 250 computes the subscription value as a weighted average or sum of the aggregated and amortized subscription cost parameters.

The subscription value module 250 can also compute the per day or per period (e.g., collection of days, such as 5 or 10 days) subscription value. This subscription value can be referred to as the amortized subscription value that is used to measure or compute an in-use (suspension) period for a given experience-related resource. For example, the subscription value module 250 may determine the total cost of the subscription for the entire year $30,000 (e.g., by multiplying the number of months in a year, 12, by the monthly subscription fee, $2500). The subscription value module 250 may amortize the yearly subscription cost on a specified repeated period (e.g., daily, monthly, hourly, weekly) basis to determine the amount of the subscription paid during the per day or per period interval. For example, if the repeated period is daily, the subscription value module 250 computes the amortized subscription value to be $82.19 (e.g., annual subscription fee $30,000 divided by 365 days per year). As another example, if the repeated period is a collection of 5 days, the subscription value module 250 computes the amortized subscription value to be $410.95 (e.g., annual subscription fee $30,000 divided by 365 days per year and multiplied by 5 days).

The subscription value module 250 provides the parameters of the subscription value to the in-use period module 252. The in-use period module 252 is configured to compute an in-use period for each experience-related resource identified by the experience services search module 260. For example, based on the amortized subscription value, the in-use period module 252 can divide a total cost of a given experience-related resource (with or without an added margin applied) by the amortized subscription value to determine the in-use period for the given experience. Namely, if a given experience costs $500 and the repeated period is daily, the in-use period module 252 computes the associated in-use period to be seven days (e.g., $500/$82.19 daily subscription cost rounded to the next highest integer). In some cases, the subscription value module 250 communicates with the trained machine learning technique module 230 to obtain a classification for the user making the experience request and further applies a modification to the in-use period (increasing or decreasing the computed in-use period) based on the classification of the user.

For example, after experience services search module 260 identifies the list of experience services that are available on the future experience start date and that meet the experience destination or geographical region parameters, the experience services search module 260 obtains first and second costs associated with each of the experience destinations from the databases 128. The experience services search module 260 provides the costs to the in-use period module 252 to compute the associated in-use period of each experience service. The experience services search module 260 removes or filters from the list any experience service that has a first or second cost that results in an in-use period (as determined by the in-use period module 252) that exceeds a maximum in-use period amount (e.g., a maximum subscription value days amount specified by a user). The experience services search module 260 removes or filters from the list any experience service that has a first or second cost that results in an in-use period (as determined by the in-use period module 252) that is lower or less than a minimum in-use period amount (e.g., a minimum subscription value days amount specified by a user). The experience services search module 260 may also filter out and remove any experience destination that has a cancelation policy that fails to satisfy cancelation policy criteria. In some cases, the experience services search module 260 communicates with the trained machine learning technique module 230 to obtain a classification for the user making the experience request and further filters or removes travel services based on the classification of the user. The experience services search module 260 provides the filtered list of travel services back to the new experience service request module 240 for provision to the client device 110 and presentation to the user for selection and requesting to make a reservation.

To classify users, the trained machine learning technique module 230 is initially trained based on training data. Specifically, the experience services training data module 210 includes a list of experience services activities associated with various subscribers of the experience services system 124. The experience services activities are obtained by the experience services training data module 210 from database 128 and/or from third-party server 130. For example, the experience services training data module 210 obtains the number of reservations made by a user from database 128 and obtains the cancelation frequency from third-party server 130. The experience services training data module 210 may access training data including the number of reservations made by each user, the subscription duration of each user, suspension period previously applied to the subscriber's account, the distance to travel destination of each user, the margin amount of each user, the reservation frequency of each user, the cancelation frequency of each user, and an assigned classification of each user. The classification may represent a level of activity of each user from not active, to medium active, to very active. The classification is used to control and filter the types and quantity of experience services provided to different users and can be used to modify an in-use period computed for a given subscriber for one or more future experience-related resources.

Machine learning technique training module 220 is trained to predict a classification for a subscriber of the experience services system 124 by establishing a relationship between one or more known experience services activities of other users provided by experience services training data module 210 and the corresponding known classification of the other users provided by the experience services training data module 210. In some cases, the machine learning technique training module 220 is trained to predict an in-use period modification for a subscriber of the experience services system 124 by establishing a relationship between one or more known experience services activities of other users provided by experience services training data module 210 and the corresponding known in-use period modifications of the other users provided by the experience services training data module 210. In some cases, the machine learning technique training module 220 is trained to predict an accumulated days fraction (to use based on a reservation cancelation request) for a subscriber of the experience services system 124 by establishing a relationship between one or more known experience services activities of other users provided by experience services training data module 210 and the corresponding known accumulated days fractions of the other users provided by the experience services training data module 210.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data (e.g., travel services activity information) in order to make data-driven predictions or decisions expressed as outputs or assessments. Although examples are presented with respect to a few machine-learning tools, the principles presented herein may be applied to other machine-learning tools. In some examples, different machine-learning tools may be used. For example, Logistic Regression (LR), Naive-Bayes, Random Forest (RF), neural networks (NN), matrix factorization, and Support Vector Machines (SVM) tools may be used for classifying a given user (or computing a modification to a suspension period) based on experience activities of the user.

The machine-learning algorithms utilize features (e.g., various combinations of experience services activities performed by other users in interacting and making reservations with the experience services system 124) for analyzing the data to generate assessments (e.g., a classification of the users and/or in-use period modifications and/or accumulated days fractions). A feature is an individual measurable property of a phenomenon being observed. The concept of a feature is related to that of an explanatory variable used in statistical techniques such as linear regression. Choosing informative, discriminating, and independent features is important for effective operation in pattern recognition, classification, and regression. Features may be of different types, such as numeric features, strings, and graphs.

In one example, the features may be of different types and may include one or more of a number of reservations made by each user, the subscription duration of each user, suspension period, in-use period modification, accumulated days fractions, the distance to experience destination of each user, the margin amount of each user, the reservation frequency of each user, and the cancelation frequency of each user.

The machine-learning algorithms utilize the training data to find correlations among the identified features that affect the outcome or assessment (e.g., the known or assigned classification of each user and/or modifications to the suspension periods of each user). In some examples, the training data includes labeled data, which is known data for one or more identified features and one or more outcomes, such as the assigned classification of the user and/or modification to the suspension period.

Once the training data are collected and processed, a machine learning technique training module 220 model can be built using either statistical learning or machine learning techniques. In one example, regression analysis can be used to build the machine learning technique training module 220 model. Regression analysis is a statistical process for estimating the relationships among variables. There are a number of known methods to perform regression analysis. Linear regression or ordinary least squares regression, among others, are "parametric" in that the regression function is defined in terms of a finite number of unknown model parameters that can be estimated from training data. For classification or suspension period modification prediction, a regression model (e.g., Equation 1) can be defined, for example, as:

$$H=f(X,\beta),\qquad\text{(Equation 1)}$$

where "H" denotes the known classification or in-use period modification or accumulated days fraction, "X" denotes a vector of input variables (e.g., any one of the experience services activities associated with the set of users), and "P" denotes a vector of unknown parameters to be determined or trained for the regression model.

The training data that include experience services activities of various users and the corresponding classification or in-use period modification (which can be manually or automatically specified for each user) or accumulated days fractions provide a set of known H values having corresponding X values (e.g., feature vectors extracted from the experience services activities). Using these data, the model parameter p can be computed using data fitting techniques such as least squares, maximum likelihood, or the like. Once P is estimated, the model can then compute H (e.g., a user experience services classification and/or in-use period modification and/or accumulated days fractions) for a new set of X values (e.g., feature vectors extracted from a new set of experience services activities).

Machine learning techniques train models to accurately make predictions on data fed into the models. During a learning phase, the models are developed against a training dataset of inputs to optimize the models to correctly predict the output for a given input. Generally, the learning phase may be supervised, semi-supervised, or unsupervised, indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs and is evaluated over several epochs to more reliably provide the output that is specified as corresponding to the given input for the greatest number of inputs for the training dataset. In another example, for an unsupervised learning phase, a model is developed to cluster the dataset into n groups and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, and so forth.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau —the learning phase for the given model may terminate before the epoch number/computing budget is reached.

Once the learning phase is complete, the models are finalized. In some examples, models that are finalized are evaluated against testing criteria. In a first example, a testing dataset that includes known outputs for its inputs is fed into the finalized models to determine an accuracy of the model in handling data on which it is has not been trained. In a second example, a false positive rate or false negative rate may be used to evaluate the models after finalization. In a third example, a delineation between data clusterings is used to select a model that produces the clearest bounds for its clusters of data. In some examples, the machine learning technique training module 220 is trained to establish a relationship to classify a user or provide a suspension period modification based on a logistic regression of one or more features (e.g., training data received from experience services training data module 210).

After being trained, the machine learning technique is provided to trained machine learning technique module 230. In one example, the coefficient values of the machine learning technique (e.g., the linear model) are stored in a storage of trained machine learning technique module 230. Trained machine learning technique module 230 is configured to receive new experience services activities of a new user from new experience service request module 240. For example, the new experience service request module 240 receives a user input that identifies a desired experience destination and future experience dates and accesses previously stored interaction information for the user (e.g., the number of prior reservations made by the user and the distance traveled by the user from the user's home address to the travel destinations and the number of times the user has previously had an in-use state applied to the account, such as the number of times the user reserved experience-related resources associated with in-use periods).

The new experience service request module 240 accesses database 128 and/or server 130 to obtain the experience services activities for the new user. For example, new experience service request module 240 obtains the number of reservations previously made by the user, the subscription duration of the user, the distance traveled by the user to the destinations, the margin amount stored for the user, the reservation frequency of the user, the number of times the subscriber previously had the account suspended for selecting an experience service associated with an in-use period, and/or the cancelation frequency of the user. The new experience service request module 240 instructs the trained machine learning technique module 230 to apply the trained machine learning technique using the previously computed coefficients to the data provided by the new experience service request module 240. Trained machine learning technique module 230 provides a classification for the new user and/or an in-use period modification based on the data provided by the new experience service request module 240.

In one example, after being trained, the machine learning technique training module 220 classifies a new user as a very active user as a function of the number of reservations made by the user in a given subscription period (e.g., within a year). A user that makes more than two reservations in a given month may be classified as a very active user and be provided more limited and less interesting experience services options for a given search request than another user who is classified as a not very active user and provides the same search request. In addition, the very active user may be provided a greater in-use period modification (e.g., a 3-day increase applied to the in-use period of a given experience-related service) than the modification applied to a non-active user (e.g., the non-active user may be provided a 1 day increase or negative 3 day increase for the same experience-related resource provided to the very active user). For example, a particular hotel reservation may be presented to the user associated with the very active classification with a 13 day in-use period. The same particular hotel reservation may be presented to the user associated with the non-active user classification with a 9 day in-use period even though both users pay the same subscription cost or have the same amortized subscription value.

In one example, after being trained, the machine learning technique training module 220 estimates a first in-use period modification for a new user as a function of any one of the previously discussed experience activities. This estimated first in-use period modification can be positive or negative and is used to adjust the raw suspension period computed for a given experience-related resource. For example, if the experience-related resource is associated with a five day in-use period (as computed by dividing the cost of the experience-related resource by the per day subscription value of the subscriber's subscription) and the first in-use period modification is estimated to be two days, the in-use period provided to the new user can be seven days for reserving the experience-related resource. As another example, if the experience-related resource is associated with a five day in-use period (as computed by dividing the cost of the experience-related resource by the per day subscription value of the subscriber's subscription) and the first in-use period modification is estimated to be negative one day, the suspension period provided to the new user can be four days for reserving the experience-related resource.

The new experience service request module 240 may receive a user request to reserve a given experience service associated with an in-use period. In response, the experience service request module 240 may prevent a user from making further or additional experience service reservations starting from the current date (the booking date) and ending on a date that follows the booking date by an amount of time corresponding to the suspension period (e.g., the in-use period end date is a computed by adding the duration of the in-use period to the booking date).

Figure 3:
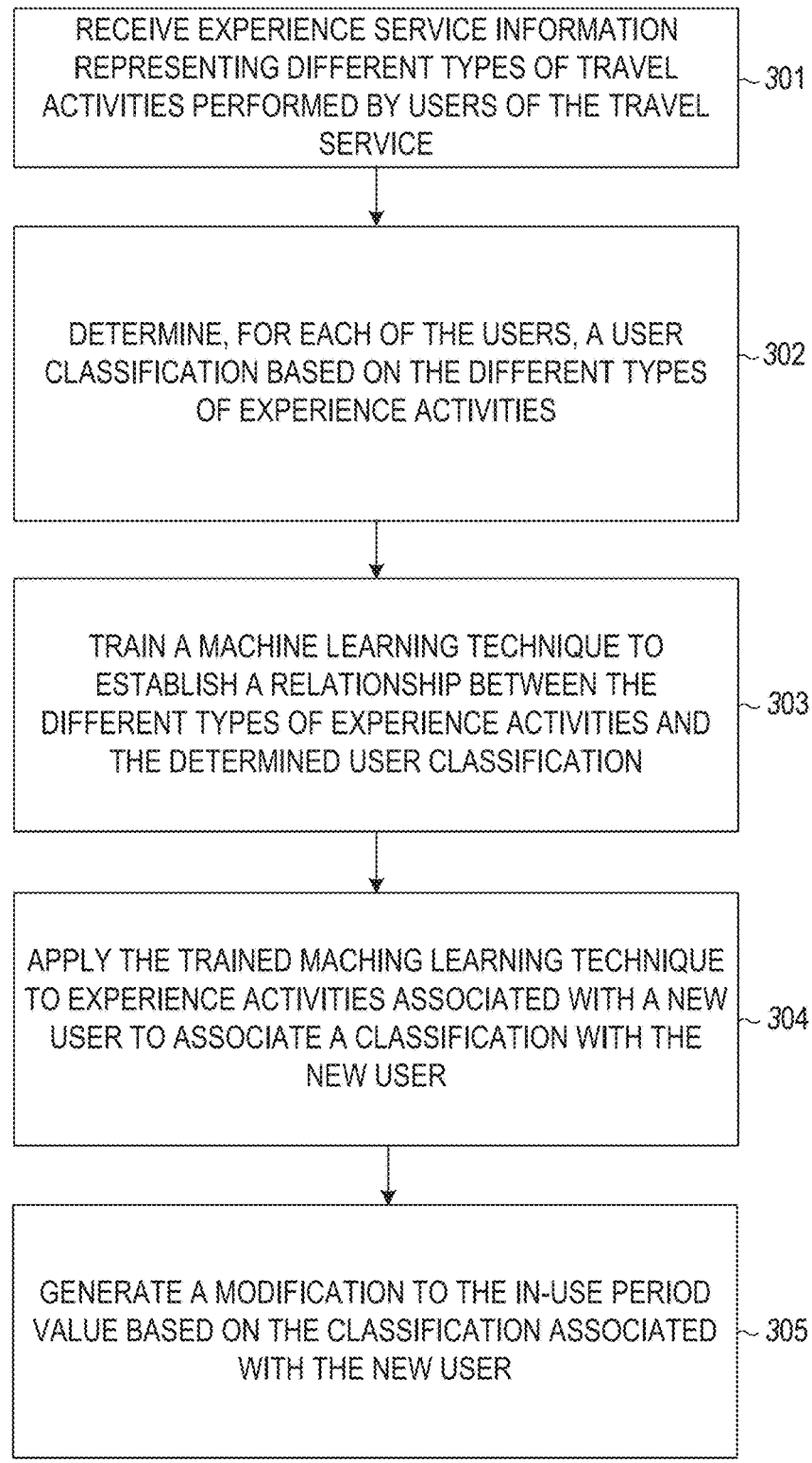
FIGS. 3-4 illustrate flow diagrams of processes of the experience services system, according to some examples.
Figure 4:
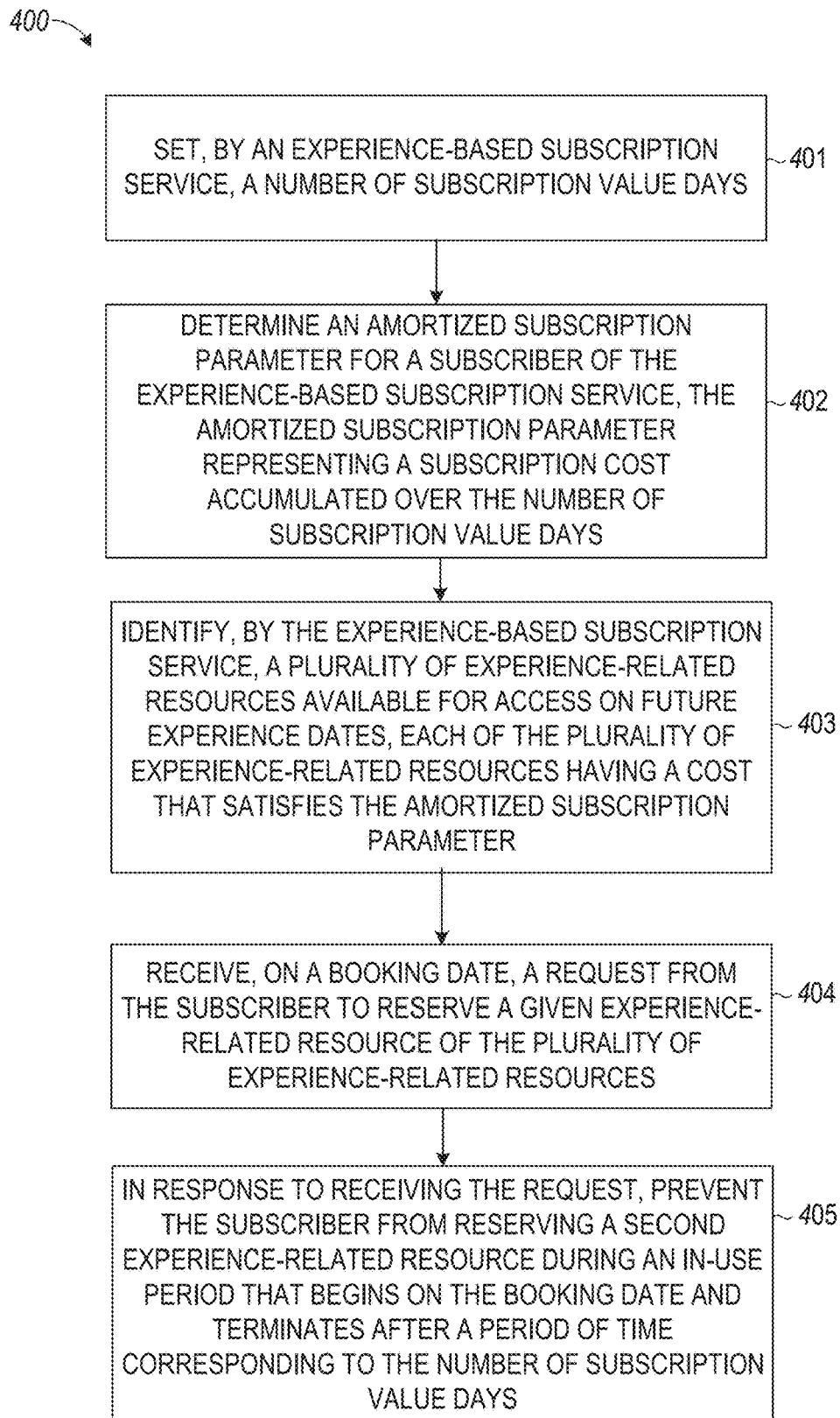

FIGS. 3-4 illustrate flow diagrams of processes of the experience services system 124, according to some examples. The processes 300-400 may be embodied in computer-readable instructions for execution by one or more processors such that the operations of the processes 300-400 may be performed in part or in whole by the functional components of the server system 108; accordingly, the processes 300-400 are described below by way of example with reference thereto. However, in other examples at least some of the operations of the processes 300-400 may be deployed on various other hardware configurations. The processes 300-400 are therefore not intended to be limited to the server system 108 and can be implemented in whole, or in part, by any other component. Any operation in the processes 300-400 can be performed in any order or entirely omitted and skipped.

At operation 301, a computing system (e.g., server system 108) receives experience service information representing different types of experience activities performed by users of the experience service. For example, experience services training data module 210 obtains from database 128 and/or server 130 experience services activities of various types associated with users of the experience services system 124 (e.g., number of reservations made, subscription duration, distance to travel destinations, margin amount, reservation frequency, cancelation frequency, etc.).

At operation 302, the computing system determines, for each of the users, a user classification, based on the different types of experience activities. For example, experience services training data module 210 accesses data stored in database 128 that indicates the known classification of each user for which experience activities information is received and/or the known suspension period modifications of each user.

At operation 303, the computing system trains a machine learning technique to establish a relationship between the different types of experience activities and the determined user classification and/or the known suspension period modifications. For example, experience services training data module 210 provides the known experience activities of the users and the known classifications or in-use period modifications associated with each user to machine learning technique training module 220. For example, experience services training data module 210 provides the known experience activities of the users and the known accumulated days fraction associated with each user to machine learning technique training module 220. Machine learning technique training module 220 inputs the received data into a linear model (e.g., a log odds model) to estimate or compute coefficients associated with each activity. In some implementations, machine learning technique training module 220 performs a regression technique to estimate the coefficients of the model.

At operation 304, the computing system applies the trained machine learning technique to experience activities associated with a new user to associate a classification with the new user or estimate an in-use period modification or accumulated days fraction for the new user. For example, new experience service request module 240 obtains an experience request from a user, via a graphical user interface on a client device 110, and obtains from database 128 experience activities previously performed by the user. The trained machine learning technique module 230 is applied to the information provided by the new experience service request module 240 to obtain and associate a classification with the new user and/or estimate a suspension period modification for the new user.

At operation 305, the computing system generates a modification value for an in-use period based on the classification associated with the new user and/or the estimated in-use period modification.

At operation 401, the computing system sets, by an experience-based subscription service, a number of subscription value days, as discussed above.

At operation 402, the computing system determines an amortized subscription parameter for a subscriber of the experience-based subscription service, the amortized subscription parameter representing a subscription cost accumulated over the number of subscription value days, as discussed above.

At operation 403, the computing system identifies a plurality of experience-related resources available for access on future experience dates, each of the plurality of experience-related resources having a cost that satisfies the amortized subscription parameter, as discussed above.

At operation 404, the computing system receives, on a booking date, a request from the subscriber to reserve a given experience-related resource of the plurality of experience-related resources, as discussed above.

At operation 405, the computing system, in response to receiving the request, prevents the subscriber from reserving a second experience-related resource during an in-use period that begins on the booking date and terminates after a period of time corresponding to the number of subscription value days, as discussed above.

FIG. 5A is an illustrative graphical user interface 500 of the experience services system 124, according to some examples. As shown, a user can input experience search criteria via the graphical user interface 500. The graphical user interface 500 includes a calendar 520 that enables a user to specify one or more start dates 522 and/or one or more end dates 524. The experience services system 124 can use the inputted dates as one parameter to search for a filter a list of available experience-related resources, such as those that begin on any of the inputted start dates and/or end on any of the inputted end dates. The graphical user interface 500 also includes a region for specifying the number of subscription value days. For example, the graphical user interface 500 can include a list of different subscription value days for the user to choose from (e.g., 5 days, 10 days, 15 days). In another example, the number of subscription value days can be selected by the user via a slider 510 to define a custom period. Specifically, a first end of the slider 510 can be set to define a minimum number of subscription value days and a second end of the slider 510 can be set to define a maximum number of subscription value days. The experience services system 124 generates or defines or sets the subscription value days range or period based on the inputs received from the graphical user interface 500, such as based on the slider 510.

In some examples, the increments at which the first and second ends of the slider 510 are moved can be based on the available in-use periods of various experience-related resources. For example, the experience services system 124 can perform a preliminary search through available experience-related resources that match search criteria currently input by the user. The experience services system 124 can determine costs associated with the matching experience-related resources to identify a minimum cost of a given one of the experience-related resources. The experience services system 124 can then compute a minimum number of days for the in-use period based on the cost and represent that minimum number of days as the first end of the slider 510 (e.g., this can be a default minimum). The experience services system 124 can identify a next higher cost for another experience-related resource and compute a next higher minimum number of days. The experience services system 124 can receive input to increase the minimum number of days by sliding the first end of the slider. In response, the experience services system 124 presents the next higher minimum number of days that was computed as the currently set minimum number of days. Namely, the slider may not allow the user to sequentially add a minimum number of days to the slider but rather bases the available number of days that can be selected on the corresponding in-use periods of the matching experience-related resources. For example, the experience services system 124 can identify a first experience-related resource that is associated with a first in-use period (e.g., 5 days) and a second experience-related resource that is associated with a second in-use period (e.g., 8 days) and does not identify any experience-related resources associated with in-use periods of six and seven days. As a result, the slider 510 can be shifted starting from five minimum number of days to eight minimum number of days without allowing the user to set the slider to six or seven days. This improves the search capability as the user is prevented from setting parameters for the search that are unrealistic or that do not match any experience-related resources.

Although not shown, the graphical user interface 500 can include various other regions for inputting other experience search criteria such as an experience destination, distance to the destination, quality of the experience services, and/or any combination thereof. After the user inputs the various search criteria, the experience services system 124 detects input that selects an apply option 530. In response to selection of the apply option 530, the experience services system 124 processes the experience search criteria to automatically generate a list of matching experience services (or experience-related resources) for presentation using one or more interactive visual representations. In some cases, the experience services system 124 processes the experience search criteria and automatically selects one of a plurality of previously generated and curated lists of experience services for presentation using one or more interactive visual representations.

Figure 5B:
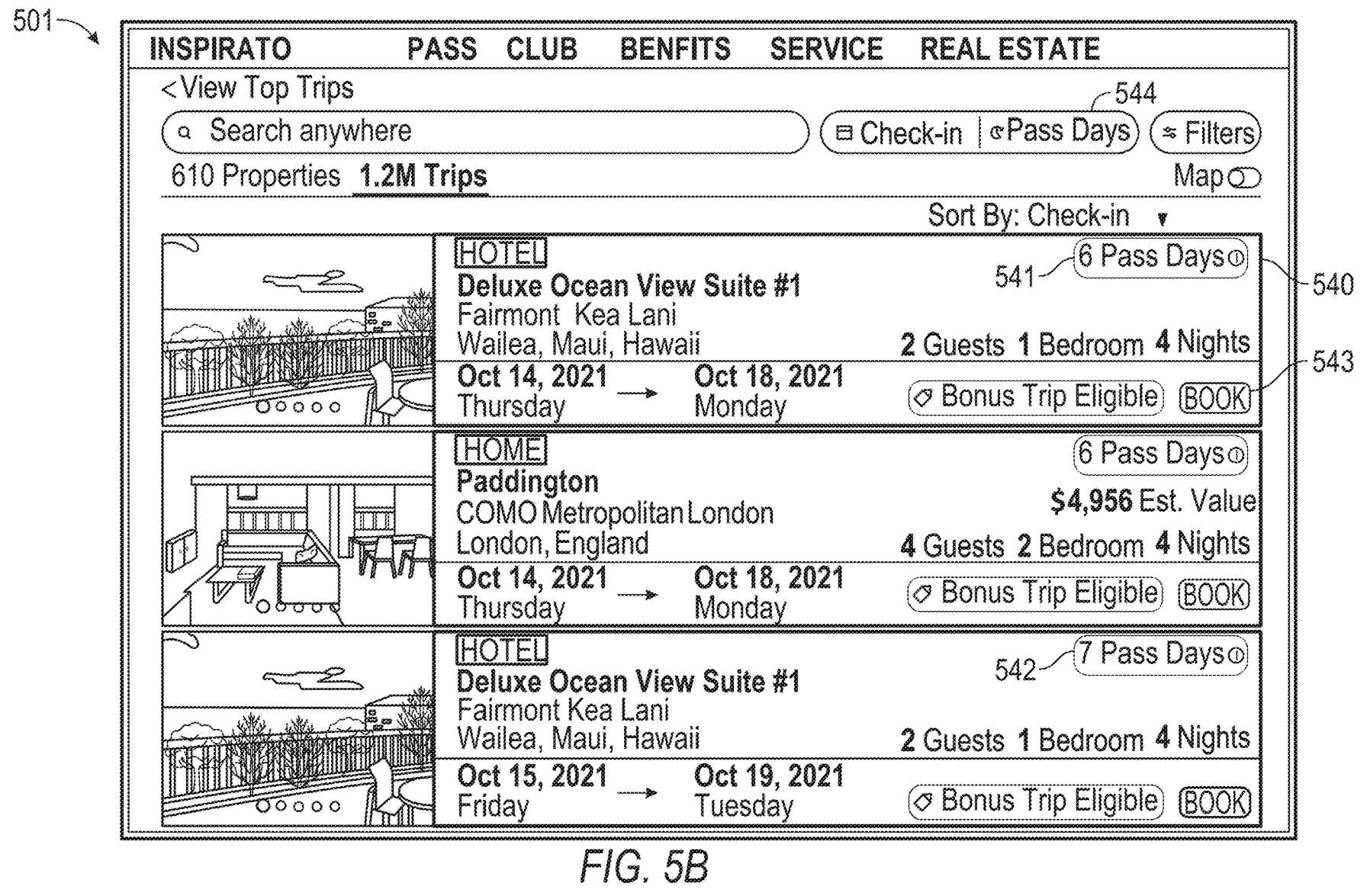

For example, as shown in FIG. 5B, a graphical user interface 501 is presented that includes a result of processing the search criteria. The graphical user interface 501 includes one or more interactive indicators 540 each representing a different experience-related resource. Each interactive indicator 540 can include a representation of the in-use period computed for the respective experience-related resource. For example, a first experience-related resource represented by a first interactive indicator 540 may be associated with a first in-use period 541 (e.g., six day in-use period). A second experience-related resource represented by a second interactive indicator may be associated with a second in-use period 542 (e.g., seven day in-use period). The one or more interactive indicators 540 can be sorted based on the duration of the corresponding in-use periods and/or one or more other factors. In some cases, the experience with the shortest or longest in-use period can be presented at the top of the list or according to any other sort criteria automatically determined or input by a user.

In response to receiving input from the user that selects a book option 543 associated with the first experience-related resource represented by the first interactive indicator 540, the experience services system 124 suspends or restricts the user's account or disables the option for the user to reserve any additional experience-related resources for a six-day period of time corresponding to the first in-use period 541. This period of time during which the account is suspended starts from the date the user selects to reserve the experience by confirming selection of the book option 543. In some implementations, the experience services system 124 presents a notification in response to receiving a user request to reserve a given experience service (or experience-related resource) via selection of the book option 543. The notification may be based on the specified in-use period associated with the selected experience. The notification may inform the user about the suspension period representing how long the user has to wait (following booking of the given experience service) before reserving an additional experience service.

In some cases, graphical user interface 501 includes a pass days option 544. In response to receiving selection of the pass days option 544, the experience services system 124 presents a window allowing the user to modify the minimum and/or maximum number of subscription value days that are used to filter the list of experience-related resources by their respective in-user periods. In one example, the experience services system 124 presents a slider 510 (FIG. 5A) in response to receiving input that selects the pass days option 544.

Figure 5C:
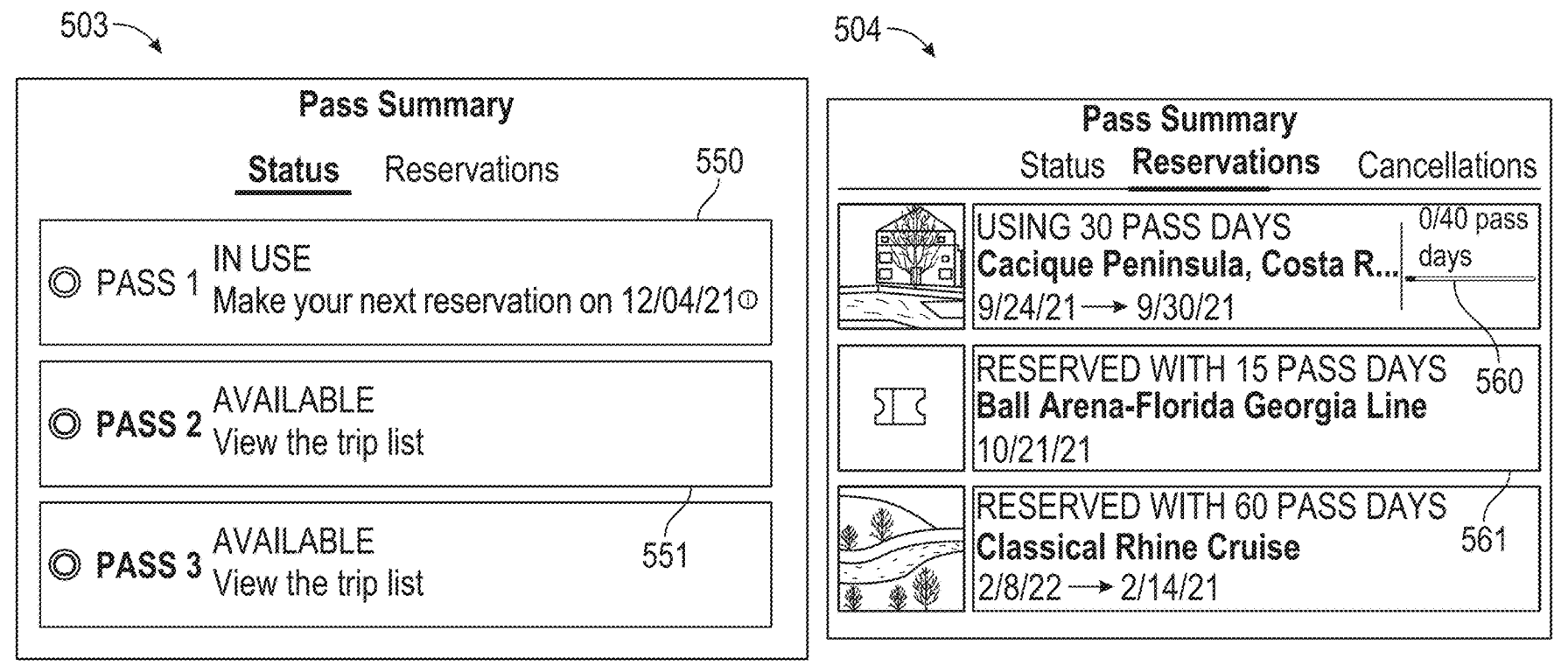

After receiving input that selects the book option 543, the experience services system 124 can allow the user to view the current status of the subscription. For example, the experience services system 124 can receive input that requests to navigate to a subscription summary. In response, the experience services system 124 presents a graphical user interface 503, as shown in FIG. 5C. The graphical user interface 503 presents a list of different subscriptions associated with the user. For example, the user may maintain multiple subscriptions for themselves, different employees or members of the family. The graphical user interface 503 presents a first representation 550 of a first subscription. The first representation 550 can indicate that the subscription status is in an in-use state. Namely, the first subscription currently has a reservation booked and is still within a suspension period during which the first subscription cannot reserve additional experience-related resources. The first representation 550 can provide a notification specifying when the in-use state will end and transition to the available state in which additional reservations can be made. The graphical user interface 503 presents a second representation 551 of a second subscription. The second subscription can be in the available state which is represented by the second representation 551.

The experience services system 124 can receive input that selects the second representation 551. In response, the experience services system 124 navigates the user to graphical user interface 501 (FIG. 5B) or another user interface to input search parameters and book another experience-related resource.

The experience services system 124 can receive input that selects the first representation 550. In response, the experience services system 124 presents a graphical user interface 504. The graphical user interface 504 includes a list of different current and past reservations of experience-related resources. The list can include a first representation 561 of a first experience-related resource which has been previously reserved. The first representation 561 can include a message indicating the in-use period that elapsed or the subscription value days amount associated with the first experience-related resource. The graphical user interface 504 can include a second representation of a second experience-related resource which has been previously reserved. The experience services system 124 can determine that the second experience-related resource is currently associated with an in-use period that has not elapsed. Namely, the experience services system 124 can compute a difference between a booking date of the second experience-related resource and a current date. The experience services system 124 can compare the computed difference to the in-use period associated with the second experience-related resource. If the difference is less than the in-use period, the experience services system 124 displays a progress bar 560 that specifies how much time remains (e.g., the computed difference). The progress bar 560 can specify the total in-use period duration (e.g., 40 days) relative to the amount of time (e.g., number of days) that has elapsed since the second experience-related resource was reserved. Once the experience services system 124 determines that the difference between the booking date of the second experience-related resource and the current date exceeds the in-use period associated with the second experience-related resource, the experience services system 124 removes the progress bar 560 from the second representation and indicates that the second experience-related resource has been reserved with the in-use period.

The experience services system 124 can allow the user to select any of the experiences listed in the graphical user interface 504 to cancel a given one of the experiences. As discussed above, in response to canceling the given one of the experiences, the experience services system 124 computes an accumulated days credit based on a difference between a current date on which the cancelation is requested and the start date associated with the experience-related resource. Namely, the experience services system 124 can credit an account the full value of the in-use period associated with the canceled experience-related resource if the difference is above a threshold. The experience services system 124 can credit an account a fraction (e.g., computed based on a classification of the user) of the full value of the in-use period associated with the canceled experience-related resource if the difference is below a threshold.

In some cases, the experience services system 124 allows the user to reserve additional experience-related resources while the account is in the in-use state, such as by paying a fee or by requesting to extend the in-use period by a specified amount of time. For example, the amount of time remaining in the in-use period may be 10 days. The experience services system 124 can allow the user to request experiences with in-use periods computed to be five days in response to receiving a request from the user to extend the in-use period by five days or by more than five days.

Figure 6:
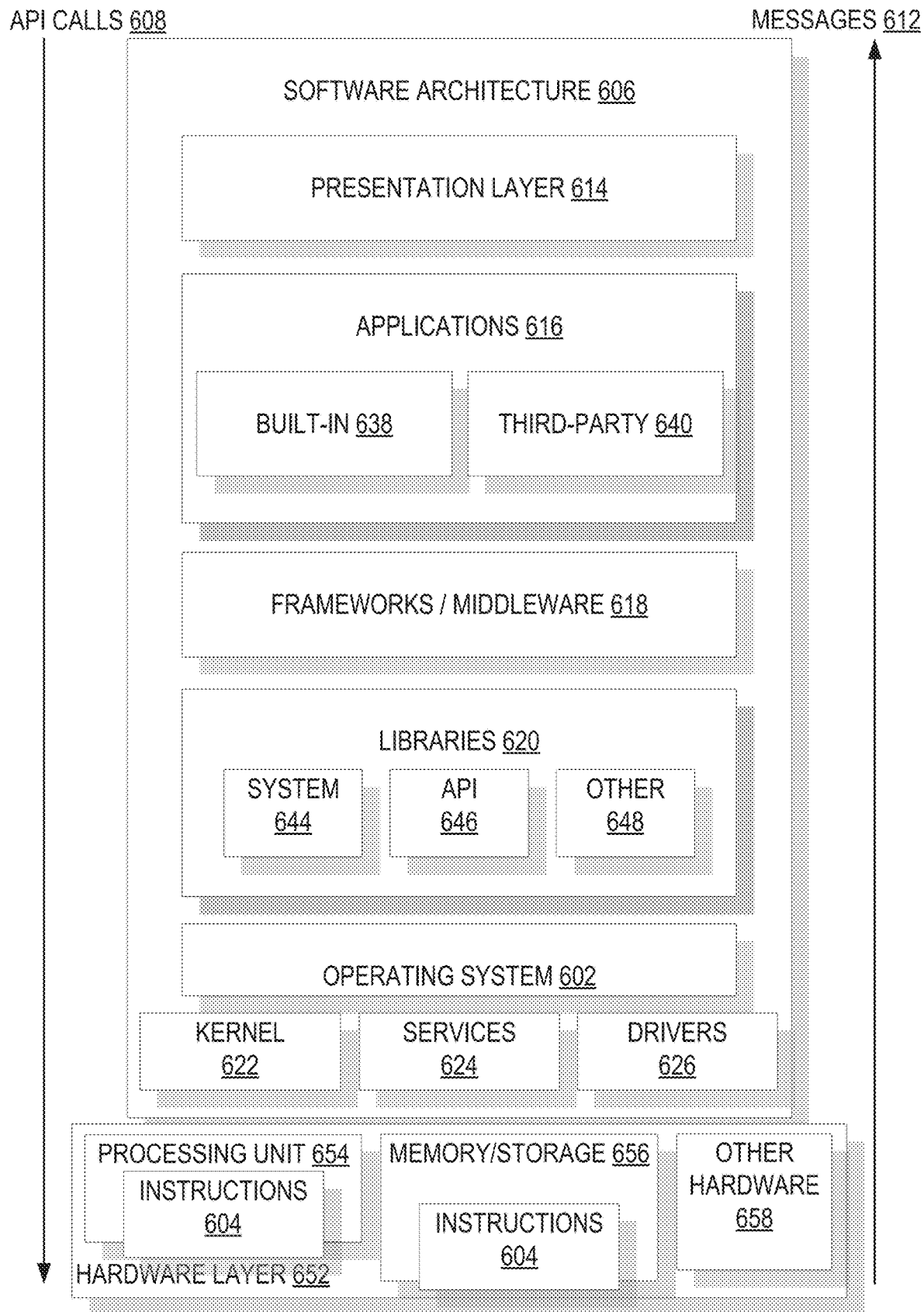
FIG. 6 is a block diagram illustrating an example of a software architecture that may be installed on a machine, according to some examples.

FIG. 6 is a block diagram illustrating software architecture 606, which can be installed on any one or more of the devices described above. For example, in various examples, client devices 110 and servers and systems 130, 108, 120, 122, and 124 may be implemented using some or all of the elements of software architecture 606. FIG. 6 is merely a non-limiting example of a software architecture, and it will be appreciated that many other architectures can be implemented to facilitate the functionality described herein. In various examples, the software architecture 606 is implemented by hardware (including a hardware layer 652 with processing unit 654, memory/storage 656, and other hardware 658) such as machine 700 of FIG. 7 that includes processors 704, memory/storage 706, and input/output (I/O) components 718. As explained below, the processing unit 654 is configured to execute instructions 604 that are stored in memory/storage 656. In this example, the software architecture 606 can be conceptualized as a stack of layers where each layer may provide a particular functionality. For example, the software architecture 606 includes layers such as an operating system 602, presentation layer 614 libraries 620, frameworks 618, and applications 616. Operationally, the applications 616 invoke API calls 608 through the software stack and receive messages 612 in response to the API calls 608, consistent with some examples.

In various implementations, the operating system 602 manages hardware resources and provides common services. The operating system 602 includes, for example, a kernel 622, services 624, and drivers 626. The kernel 622 acts as an abstraction layer between the hardware and the other software layers, consistent with some examples. For example, the kernel 622 provides memory management, processor management (e.g., scheduling), component management, networking, and security settings, among other functionalities. The services 624 can provide other common services for the other software layers. The drivers 626 are responsible for controlling or interfacing with the underlying hardware, according to some examples. For instance, the drivers 626 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some examples, the libraries 620 provide a low-level common infrastructure utilized by the applications 616. The libraries 620 can include system libraries 644 (e.g., C standard library) that can provide functions such as memory allocation functions, string manipulation functions, mathematic functions, and the like. In addition, the libraries 620 can include API libraries 646 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 620 can also include a wide variety of other libraries 648 to provide many other APIs to the applications 616.

The frameworks 618 provide a high-level common infrastructure that can be utilized by the applications 616, according to some examples. For example, the frameworks 618 provide various graphic user interface functions, high-level resource management, high-level location services, and so forth. The frameworks 618 can provide a broad spectrum of other APIs that can be utilized by the applications 616, some of which may be specific to a particular operating system 602 or platform.

In an example, the applications 616 include built-in applications 638 including any one or more of a home application, a contacts application, a browser application, a book reader application, a location application, a media application, a messaging application, a game application, and a broad assortment of other applications such as a third-party application 640. According to some examples, the applications 616 are programs that execute functions defined in the programs. Various programming languages can be employed to create one or more of the applications 616, structured in a variety of manners, such as object-oriented programming languages (e.g., Objective-C, Java, or C++) or procedural programming languages (e.g., C or assembly language). In a specific example, the third-party application 640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 640 can invoke the API calls 608 provided by the operating system 602 to facilitate functionality described herein.

Some examples may particularly include a subscription-based experience-related resource application. In certain examples, this may be a stand-alone application that operates to manage communications with a server system such as third-party servers 130 or server system 108. In other examples, this functionality may be integrated with another application. The subscription-based experience-related resource application may request and display various data related to subscription-based experience services and may provide the capability for a user to input data related to the objects via a touch interface, keyboard, or using a camera device of machine 700, communication with a server system via I/O components 718, and receipt and storage of object data in memory/storage 706. Presentation of information and user inputs associated with the information may be managed by subscription-based experience-related resource application using different frameworks 618, library 620 elements, or operating system 602 elements operating on a machine 700.

Figure 7:
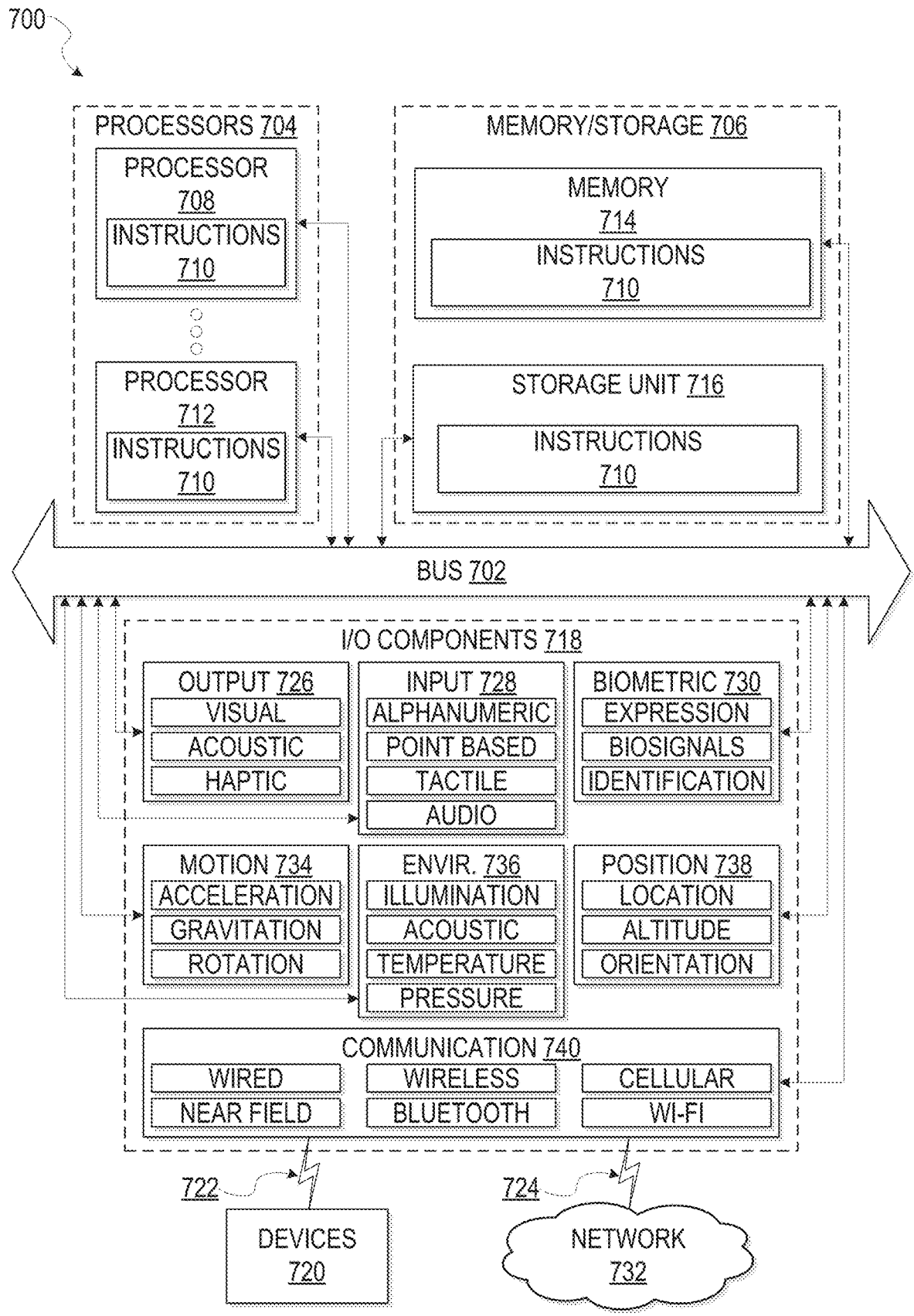
FIG. 7 illustrates a diagrammatic representation of a machine, in the form of a computer system, within which a set of instructions may be executed for causing the machine to perform any one or more of the methodologies discussed herein, according to an example.

FIG. 7 is a block diagram illustrating components of a machine 700, according to some examples, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application 616, an applet, an app, or other executable code) for causing the machine 700 to perform any one or more of the methodologies discussed herein can be executed. In alternative examples, the machine 700 operates as a standalone device or can be coupled (e.g., networked) to other machines. In a networked deployment, the machine 700 may operate in the capacity of a server or system 130, 108, 120, 122, 124, etc., or a client device 110 in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines 700 that individually or jointly execute the instructions 710 to perform any one or more of the methodologies discussed herein.

In various examples, the machine 700 comprises processors 704, memory/storage 706, and I/O components 718, which can be configured to communicate with each other via a bus 702. In an example, the processors 704 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 708 and a processor 712 that may execute the instructions 710. The term "processor" is intended to include multi-core processors 704 that may comprise two or more independent processors 708, 712 (also referred to as "cores") that can execute instructions 710 contemporaneously. Although FIG. 7 shows multiple processors 708, 712, the machine 700 may include a single processor 704 with a single core, a single processor 704 with multiple cores (e.g., a multi-core processor 704), multiple processors 704 with a single core, multiple processors 704 with multiples cores, or any combination thereof.

The memory/storage 706 comprises a main memory 714, a static memory, and a storage unit 716 accessible to the processors 704 via the bus 702, according to some examples. The storage unit 716 can include a machine-readable medium on which are stored the instructions 710 embodying any one or more of the methodologies or functions described herein. The instructions 710 can also reside, completely or at least partially, within the main memory 714, within the static memory, within at least one of the processors 704 (e.g., within the processor's cache memory), or any suitable combination thereof, during execution thereof by the machine 700. Accordingly, in various examples, the main memory 714, the static memory, and the processors 704 are considered machine-readable media.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium is shown, in an example, to be a single medium, the term "machine-readable medium" should be taken to include a single medium or multiple media (e.g., a centralized or distributed database, or associated caches and servers) able to store the instructions 710. The term "machine-readable medium" shall also be taken to include any medium, or combination of multiple media, that is capable of storing instructions (e.g., instructions 710) for execution by a machine (e.g., machine 700), such that the instructions 710, when executed by one or more processors of the machine 700 (e.g., processors 704), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 718 include a wide variety of components to receive input, provide output, produce output, transmit information, exchange information, capture measurements, and so on. In general, it will be appreciated that the I/O components 718 can include many other components that are not shown in FIG. 7. The I/O components 718 are grouped according to functionality merely for simplifying the following discussion, and the grouping is in no way limiting. In various examples, the I/O components 718 include output components 726 and input components 728. The output components 726 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 728 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further examples, the I/O components 718 include biometric components 730, motion components 734, environmental components 736, or position components 738, among a wide array of other components. For example, the biometric components 730 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 734 include acceleration sensor components (e.g., accelerometer), gravitation sensor components, rotation sensor components (e.g., gyroscope), and so forth. The environmental components 736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 738 include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 718 may include communication components 740 operable to couple the machine 700 to a network 732 or devices 720 via a coupling 724 and a coupling 722, respectively. For example, the communication components 740 include a network interface component or another suitable device to interface with the network 732. In further examples, communication components 740 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 720 may be another machine 700 or any of a wide variety of peripheral devices (e.g., a peripheral device coupled via a USB).

Moreover, in some examples, the communication components 740 detect identifiers or include components operable to detect identifiers. For example, the communication components 740 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 740, such as location via Internet Protocol (IP) geo-location, location via WI-FI® signal triangulation, location via detecting a BLUETOOTH® or NFC beacon signal that may indicate a particular location, and so forth.

In various examples, one or more portions of the network 732 can be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a WI-FI® network, another type of network, or a combination of two or more such networks. For example, the network 732 or a portion of the network 732 may include a wireless or cellular network, and the coupling 724 may be a Code Division Multiple Access (CDMA) connection, a Global System for Mobile communications (GSM) connection, or another type of cellular or wireless coupling. In this example, the coupling 722 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In examples, the instructions 710 are transmitted or received over the network 732 using a transmission medium via a network interface device (e.g., a network interface component included in the communication components 740) and utilizing any one of a number of well-known transfer protocols (e.g., Hypertext Transfer Protocol (HTTP)). Similarly, in other examples, the instructions 710 are transmitted or received using a transmission medium via the coupling 722 (e.g., a peer-to-peer coupling) to the devices 720. The term "transmission medium" shall be taken to include any intangible medium that is capable of storing, encoding, or carrying the instructions 710 for execution by the machine 700, and includes digital or analog communications signals or other intangible media to facilitate communication of such software.

Furthermore, the machine-readable medium is non-transitory (in other words, not having any transitory signals) in that it does not embody a propagating signal. However, labeling the machine-readable medium "non-transitory" should not be construed to mean that the medium is incapable of movement; the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific examples, various modifications and changes may be made to these examples without departing from the broader scope of examples of the present disclosure The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various examples of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. The specification and drawings are, accordingly, to be regarded in an illustrative rather than a restrictive sense.

What is claimed is:

1. A method comprising:
 setting, by an experience-based subscription service, a number of subscription value days;

determining an amortized subscription parameter for a subscriber of the experience-based subscription service, the amortized subscription parameter representing a subscription cost accumulated over the number of subscription value days;

identifying, by the experience-based subscription service, a plurality of experience-related resources available for access on future experience dates, each of the plurality of experience-related resources having a cost that satisfies the amortized subscription parameter;

receiving, on a booking date, a request from the subscriber to reserve a given experience-related resource of the plurality of experience-related resources; and in response to receiving the request, preventing the subscriber from reserving a second experience-related resource during an in-use period that is initially computed to begin on the booking date and terminate after a period of time corresponding to the number of subscription value days, wherein the in-use period is modified based on:

applying a machine-learning model to associate the subscriber with a classification, wherein the machine-learning model is trained to establish a relationship between user travel activity and user classification, and wherein the machine-learning model is trained in a learning phase comprising a preset number of epochs based on a fixed computing budget; wherein the learning phase is configured to terminate upon the first of:
either a model accuracy threshold being satisfied, or the number of epochs being reached;
and adjusting the in-use period based on the classification of the subscriber.

2. The method of claim 1, further comprising:
reserving the given experience-related resource for the subscriber; and
transitioning a status of the subscriber in the experience-based subscription service to an in-use state in response to receiving the request, the in-use state allowing the subscriber to browse additional experience-related resources without reserving any of the additional experience-related resources.

3. The method of claim 2, further comprising:
determining that an amount of time between a current date and the booking date exceeds the number of subscription value days; and
automatically transitioning the status of the subscriber in the experience-based subscription service to an available state in response to determining that the amount of time between the current date and the booking date exceeds the number of subscription value days, the available state allowing the subscriber to browse additional experience-related resources and reserve a new experience-related resource.

4. The method of claim 3, wherein the status is automatically transitioned to the available state before the future experience date associated with the given experience-related resource.

5. The method of claim 1, further comprising:
generating, for display in a graphical user interface, a plurality of interactive visual representations of each of the plurality of experience-related resources, each of the plurality of interactive visual representations comprising a visual representation of an associated in-use period during which access to the experience-based subscription service is restricted.

6. The method of claim 5, wherein a first of the interactive visual representations represents a first number of subscription value days corresponding to a first in-use period, and wherein a second of the interactive visual representations represents a second number of subscription value days corresponding to a second in-use period, the first number of subscription value days and the second number of subscription value days each being less than the number of subscription value days.

7. The method of claim 1, wherein the number of subscription value days comprises a range of subscription value days that includes a minimum number of subscription value days and a maximum number of subscription value days.

8. The method of claim 7, wherein identifying the plurality of experience-related resources comprises:
obtaining cost information for a set of experience-related resources;
computing a cost range based on the range of subscription value days; and
selecting, for inclusion in the plurality of experience-related resources, experience-related resources from the set of experience-related resources having respective cost information that is within the cost range.

9. The method of claim 1, wherein setting the number of subscription value days comprises receiving input from the subscriber that selects a subscription value days period, further comprising presenting a slider for selecting the subscription value days period.

10. The method of claim 9, further comprising:
presenting, together with the slider, a calendar; and
selecting a plurality of future travel start dates from the calendar, wherein each of the plurality of experience-related resources comprises an experience start date corresponding to one of the plurality of future travel start dates.

11. The method of claim 1, wherein the model accuracy threshold is 95%.

12. The method of claim 1, further comprising:
presenting a graphical user interface that includes a plurality of identifiers of a plurality of previously reserved experience-related resources, the plurality of identifiers comprising a first identifier of the given experience-related resource, the first identifier comprising a progress bar representing an amount of time remaining in the in-use period, the plurality of identifiers comprising a second identifier of a second experience-related resource, the second identifier representing a duration of an in-use period that has elapsed for the second experience-related resource.

13. The method of claim 12, further comprising removing the progress bar from the first identifier in response to determining that an amount of time between a current date and the booking date exceeds the number of subscription value days.

14. The method of claim 1, further comprising:
receiving input from the subscriber to cancel a reservation for the given experience-related resource; and
in response to the input, computing an accumulated days credit to offset a future number of subscription value days.

15. The method of claim 14, further comprising:
determining an amount of time between a current date on which the input to cancel the reservation is received and the booking date;

in response to determining that the amount of time exceeds a threshold, setting the accumulated days credit to be a first value corresponding to the amount of time; and in response to determining that the amount of time fails to exceed the threshold, setting the accumulated days credit to be a specified fraction of the first value or zero, the specified fraction being determined based on a classification of the subscriber.

16. The method of claim 1, further comprising:
determining that an account of the subscriber includes an accumulated days credit from a prior cancelation; and
reducing a duration of the in-use period by the accumulated days credit.

17. The method of claim 1, wherein a first of the plurality of experience-related resources comprises a package of multiple experience-related resources, wherein individual ones of the multiple experience-related resources in the package have costs that fail to meet a minimum value associated with the amortized subscription parameter, and wherein a combined cost of the individual ones of the multiple experience-related resources meets the minimum value associated with the amortized subscription parameter and is less than a maximum value associated with the amortized subscription parameter.

18. The method of claim 1, further comprising allowing the subscriber to reserve an additional experience-related resource by extending the in-use period by a specified amount of time.

19. A system comprising:
a memory that stores instructions; and
one or more processors on a server configured by the instructions to perform operations comprising:
setting, by an experience-based subscription service, a number of subscription value days;
determining an amortized subscription parameter for a subscriber of the experience-based subscription service, the amortized subscription parameter representing a subscription cost accumulated over the number of subscription value days;
identifying, by the experience-based subscription service, a plurality of experience-related resources available for access on future experience dates, each of the plurality of experience-related resources having a cost that satisfies the amortized subscription parameter;
receiving, on a booking date, a request from the subscriber to reserve a given experience-related resource of the plurality of experience-related resources; and
in response to receiving the request, preventing the subscriber from reserving a second experience-related resource during an in-use period that is initially computed to begin on the booking date and terminate after a period of time corresponding to the number of subscription value days, wherein the in-use period is modified based on:
applying a machine-learning model to associate the subscriber with a classification, wherein the machine-learning model is trained to establish a relationship between user travel activity and user classification, and wherein the machine-learning model is trained in a learning phase comprising a preset number of epochs based on a fixed computing budget; wherein the learning phase is configured to terminate upon the first of:
either a model accuracy threshold being satisfied, or the number of epochs being reached;
and adjusting the in-use period based on the classification of the subscriber.

20. A non-transitory computer-readable medium comprising instructions stored thereon that are executable by at least one processor to cause a computing device to perform operations comprising:
setting, by an experience-based subscription service, a number of subscription value days;
determining an amortized subscription parameter for a subscriber of the experience-based subscription service, the amortized subscription parameter representing a subscription cost accumulated over the number of subscription value days;
identifying, by the experience-based subscription service, a plurality of experience-related resources available for access on future experience dates, each of the plurality of experience-related resources having a cost that satisfies the amortized subscription parameter;
receiving, on a booking date, a request from the subscriber to reserve a given experience-related resource of the plurality of experience-related resources; and
in response to receiving the request, preventing the subscriber from reserving a second experience-related resource during an in-use period that is initially computed to begin on the booking date and terminate after a period of time corresponding to the number of subscription value days, wherein the in-use period is modified based on:
applying a machine-learning model to associate the subscriber with a classification, wherein the machine-learning model is trained to establish a relationship between user travel activity and user classification, and wherein the machine-learning model is trained in a learning phase comprising a preset number of epochs based on a fixed computing budget; wherein the learning phase is configured to terminate upon the first of:
either a model accuracy threshold being satisfied, or the number of epochs being reached;
and adjusting the in-use period based on the classification of the subscriber.

* * * * *